US012492905B2

(12) United States Patent
Karuppiah et al.

(10) Patent No.: US 12,492,905 B2
(45) Date of Patent: Dec. 9, 2025

(54) COMPUTER-IMPLEMENTED SYSTEM AND METHOD TO TRACK, MONITOR, STORE, AND REPORT THE LOCATION AND DWELL TIME OF AIRPORT PASSENGERS AND VEHICLES AT AIRPORT CHECKPOINTS AND FACILITIES

(71) Applicant: METROPOLITAN WASHINGTON AIRPORTS AUTHORITY, Washington, DC (US)

(72) Inventors: Balaji Karuppiah, Alexandria, VA (US); Dhamotharakkannan Seenivasagam, Alexandria, VA (US); Goutam Kundu, Alexandria, VA (US); Justin Grasso, Alexandria, VA (US); Satyanarayana Ramisetty, Alexandria, VA (US); Sushant Gulati, Alexandria, VA (US); Prabhu Nagarajan, Alexandria, VA (US); Sarathy Chelladurai, Alexandria, VA (US); Tushar Acharya, Alexandria, VA (US)

(73) Assignee: METROPOLITAN WASHINGTON AIRPORTS AUTHORITY, Washington, DC (US)

( * ) Notice: Subject to any disclaimer, the term of this patent is extended or adjusted under 35 U.S.C. 154(b) by 251 days.

(21) Appl. No.: 18/477,500

(22) Filed: Sep. 28, 2023

(65) Prior Publication Data
US 2025/0109946 A1 Apr. 3, 2025

(51) Int. Cl.
*H04L 67/50* (2022.01)
*G01C 21/20* (2006.01)
(Continued)

(52) U.S. Cl.
CPC .......... *G01C 21/206* (2013.01); *G01S 19/45* (2013.01); *H04L 67/125* (2013.01);
(Continued)

(58) Field of Classification Search
CPC .......... G01C 21/206; H04M 1/72421; H04N 23/611; H04N 7/181; G01S 19/45; H04L 67/125; H04W 64/006
(Continued)

(56) References Cited

U.S. PATENT DOCUMENTS

| 7,173,526 B1 | 2/2007 | Monroe |
| 7,480,715 B1 * | 1/2009 | Barker ............... H04L 63/1416 709/224 |

(Continued)

FOREIGN PATENT DOCUMENTS

| CN | 109214274 A * | 1/2019 | ........... G06Q 50/265 |
| EP | 3 343 435 A1 | 7/2018 | |

(Continued)

OTHER PUBLICATIONS

E.A. Yfantis, "An intelligent baggage-tracking system for airport security," Engineering Applications of Artificial Intelligence, vol. 10, Issue 6, 1997, p. 603-606 (Year: 1997).*

(Continued)

*Primary Examiner* — Taylor A Elfervig
(74) *Attorney, Agent, or Firm* — Maier & Maier, PLLC

(57) ABSTRACT

The invention relates to a computer-implemented system and method for managing human and vehicle traffic in an airport, and in particular to using a combined system for passengers and airport assets, to track, monitor, store, and report on dwell times of passengers at airport security checkpoints and locations, and to track, monitor, store, and report on the location of airport vehicles and mobile assets using cameras in combination with GPS transponders.

20 Claims, 19 Drawing Sheets

(51) Int. Cl.
*G01S 19/45* (2010.01)
*G06F 40/143* (2020.01)
*G06Q 30/0241* (2023.01)
*H04L 67/02* (2022.01)
*H04L 67/125* (2022.01)
*H04M 1/72421* (2021.01)
*H04N 7/18* (2006.01)
*H04N 23/611* (2023.01)
*H04W 64/00* (2009.01)

(52) U.S. Cl.
CPC ........ *H04M 1/72421* (2021.01); *H04N 7/181* (2013.01); *H04N 23/611* (2023.01); *H04W 64/006* (2013.01)

(58) Field of Classification Search
USPC ........................................................ 709/223
See application file for complete search history.

(56) References Cited

U.S. PATENT DOCUMENTS

| | | |
|---|---|---|
| 7,551,075 B1 | 6/2009 | Monroe |
| 7,813,871 B2 | 10/2010 | Small et al. |
| 8,125,529 B2 | 2/2012 | Skoskiewicz et al. |
| 8,340,067 B2 | 12/2012 | Buga et al. |
| 8,362,948 B2 | 1/2013 | Kolinko et al. |
| 8,391,265 B2 | 3/2013 | Stewart |
| 8,401,233 B2 | 3/2013 | Tedesco et al. |
| 8,589,994 B2 | 11/2013 | Monroe |
| 8,799,220 B2 | 8/2014 | O'Malley |
| 8,831,677 B2 | 9/2014 | Villa-Real |
| 8,902,076 B2 | 12/2014 | Pederson et al. |
| 8,941,485 B1 | 1/2015 | Mendelson |
| 8,971,932 B2 | 3/2015 | Mapes |
| 9,204,251 B1 | 12/2015 | Mendelson |
| 9,275,550 B1 | 3/2016 | Stefani et al. |
| 9,396,450 B2 | 7/2016 | Gazdzinski et al. |
| 9,424,521 B2 | 8/2016 | Bloomquist et al. |
| 9,466,038 B2 | 10/2016 | Kezeu |
| 9,772,193 B1 | 9/2017 | Mendelson |
| 10,072,932 B2 | 9/2018 | Cordova et al. |
| 10,091,276 B2 | 10/2018 | Bloomquist et al. |
| 10,212,494 B1* | 2/2019 | Struhsaker ............... H04W 4/80 |
| 10,291,314 B2 | 5/2019 | Dowlatkhah et al. |
| 10,332,405 B2 | 6/2019 | Kopardekar |
| 10,350,343 B2 | 7/2019 | Minkus |
| 10,387,976 B2 | 8/2019 | Kundu et al. |
| 10,412,283 B2 | 9/2019 | Send et al. |
| 10,445,836 B2 | 10/2019 | Hertz et al. |
| 10,593,217 B2 | 3/2020 | Shannon |
| 10,805,761 B2 | 10/2020 | Jones |
| 10,902,734 B2 | 1/2021 | Schulman et al. |
| 10,977,493 B2 | 4/2021 | Speasl et al. |
| 11,119,224 B2 | 9/2021 | Kilburn et al. |
| 11,143,736 B2 | 10/2021 | Schindler et al. |
| 11,159,909 B2 | 10/2021 | Anderson |
| 11,189,368 B2 | 11/2021 | Heath |
| 11,198,519 B1 | 12/2021 | Seeley |
| 11,209,553 B2 | 12/2021 | Linton et al. |
| 11,257,098 B2 | 2/2022 | Bakalis et al. |
| 11,327,179 B2 | 5/2022 | McKeown et al. |
| 11,379,920 B2 | 7/2022 | Steinmann et al. |
| 11,493,425 B2 | 11/2022 | Davaadorj et al. |
| 11,507,913 B2 | 11/2022 | Chung |
| 11,513,606 B2 | 11/2022 | Tran |
| 11,675,324 B2 | 6/2023 | Tran |
| 11,689,539 B2 | 6/2023 | Simons |
| 11,741,703 B2 | 8/2023 | Fathi et al. |
| 11,782,186 B2 | 10/2023 | Brown |
| 11,790,760 B2 | 10/2023 | Brown et al. |
| 11,804,650 B2 | 10/2023 | Bennett |
| 2005/0083171 A1* | 4/2005 | Hamilton ............... H04B 1/385 340/572.1 |
| 2008/0258880 A1* | 10/2008 | Smith ..................... H04L 67/12 455/404.2 |
| 2012/0249363 A1 | 10/2012 | Kolinko et al. |
| 2016/0093219 A1 | 3/2016 | Bailey et al. |
| 2017/0108339 A1* | 4/2017 | Silverstein ............... H04W 4/33 |
| 2017/0201517 A1 | 7/2017 | Gazdzinski et al. |
| 2017/0243494 A1 | 8/2017 | Taveira et al. |
| 2018/0019801 A1 | 1/2018 | Dowlatkhah et al. |
| 2018/0061010 A1 | 3/2018 | Akselrod et al. |
| 2018/0095155 A1 | 4/2018 | Soni et al. |
| 2018/0181144 A1 | 6/2018 | Steinmann et al. |
| 2018/0211718 A1 | 7/2018 | Heath |
| 2018/0288213 A1 | 10/2018 | Bjontegard |
| 2018/0340778 A1 | 11/2018 | Cordova et al. |
| 2018/0365635 A1 | 12/2018 | Lucrecio et al. |
| 2018/0365771 A1 | 12/2018 | Kilburn |
| 2019/0028534 A1 | 1/2019 | Bloomquist et al. |
| 2019/0086545 A1 | 3/2019 | Mooney et al. |
| 2019/0101650 A1 | 4/2019 | McKeown et al. |
| 2019/0113632 A1 | 4/2019 | Lucrecio et al. |
| 2019/0172964 A1 | 6/2019 | Hermes et al. |
| 2019/0174208 A1 | 6/2019 | Speicher et al. |
| 2019/0221127 A1 | 7/2019 | Shannon |
| 2019/0236732 A1 | 8/2019 | Speasl et al. |
| 2019/0265703 A1 | 8/2019 | Hicok et al. |
| 2019/0281370 A1* | 9/2019 | Struhsaker ............... H04W 4/80 |
| 2020/0053533 A1 | 2/2020 | Wesby |
| 2020/0059707 A1 | 2/2020 | Lucrecio et al. |
| 2020/0074398 A1 | 3/2020 | Linton et al. |
| 2020/0082168 A1 | 3/2020 | Fathi et al. |
| 2020/0104790 A1 | 4/2020 | Chung |
| 2020/0160032 A1 | 5/2020 | Allen et al. |
| 2020/0184706 A1 | 6/2020 | Speasl et al. |
| 2020/0265726 A1 | 8/2020 | LeBlanc |
| 2020/0272827 A1 | 8/2020 | Morrow et al. |
| 2020/0349852 A1 | 11/2020 | Dicosola |
| 2020/0365981 A1 | 11/2020 | Bennett |
| 2020/0371237 A1 | 11/2020 | Schindler et al. |
| 2021/0089055 A1 | 3/2021 | Tran |
| 2021/0117955 A1 | 4/2021 | Stone et al. |
| 2021/0133670 A1 | 5/2021 | Cella et al. |
| 2021/0166143 A1 | 6/2021 | Bloomquist et al. |
| 2021/0209614 A1 | 7/2021 | Bakalis et al. |
| 2021/0224539 A1 | 7/2021 | Speasl et al. |
| 2021/0241396 A1 | 8/2021 | Kundu et al. |
| 2021/0302621 A1 | 9/2021 | Brown |
| 2021/0319703 A1 | 10/2021 | Schulman et al. |
| 2021/0327255 A1 | 10/2021 | Brown et al. |
| 2021/0352080 A1 | 11/2021 | Simons |
| 2021/0357823 A1 | 11/2021 | Cella et al. |
| 2022/0036301 A1 | 2/2022 | Cella et al. |
| 2022/0036989 A1 | 2/2022 | Minkus et al. |
| 2022/0041299 A1 | 2/2022 | Wankewycz et al. |
| 2022/0187841 A1 | 6/2022 | Ebrahimi Afrouzi et al. |
| 2022/0329970 A1 | 10/2022 | Wang et al. |
| 2023/0049845 A1 | 2/2023 | Tran |
| 2023/0123322 A1 | 4/2023 | Cella et al. |
| 2023/0262414 A1 | 8/2023 | Jones |
| 2023/0387580 A1 | 11/2023 | Bennett |

FOREIGN PATENT DOCUMENTS

| | | | |
|---|---|---|---|
| EP | 3 416 114 A1 | 12/2018 | |
| EP | 4 239 371 A2 | 9/2023 | |
| WO | WO-0227686 A1 * | 4/2002 | ............... G07C 9/37 |
| WO | WO-2015128645 A1 * | 9/2015 | ......... G06K 19/0723 |
| WO | WO-2022018722 A1 * | 1/2022 | ......... G06Q 10/0631 |

OTHER PUBLICATIONS

K. Grgić, I. Špeh and I. Heđi, "A web-based IoT solution for monitoring data using MQTT protocol," 2016 International Conference on Smart Systems and Technologies (SST), Osijek, Croatia, 2016, pp. 249-253 (Year: 2016).*

G. Pestana, A. Casaca, I. Rebelo and S. Couronné, "LocON: A location based services platform to improve airport safety," 2011 Aerospace Conference, Big Sky, MT, USA, 2011, pp. 1-10 (Year: 2011).*

S. Knoch, P. Staudt, B. Puzzolante and A. Maggi, "A Smart Digital Platform for Airport Services Improving Passenger Satisfaction,"

(56) References Cited

OTHER PUBLICATIONS

2020 IEEE 22nd Conference on Business Informatics (CBI), Antwerp, Belgium, 2020, pp. 250-259 (Year: 2020).*

International Search Report and Written Opinion issued on Dec. 9, 2024, in corresponding International Application No. PCT/US24/44600, 11 pages.

Santamaria et al., "An Iot Surveillance System Based on a Decentralised Architecture", Sensors, MDPI, www.mdpi./journal/senors, Mar. 26, 2019, vol. 19, 23 pages.

Lombardo, "The Ultimate Guide on How to Use MGTT with Node.js", HiveMQ, https://www.hivemq.com/blog/ultimate-guide-on-how-to-use-mqtt-with-node-js/, May 16, 2023, 39 pages.

* cited by examiner

Fig. 10 - trained alignment database
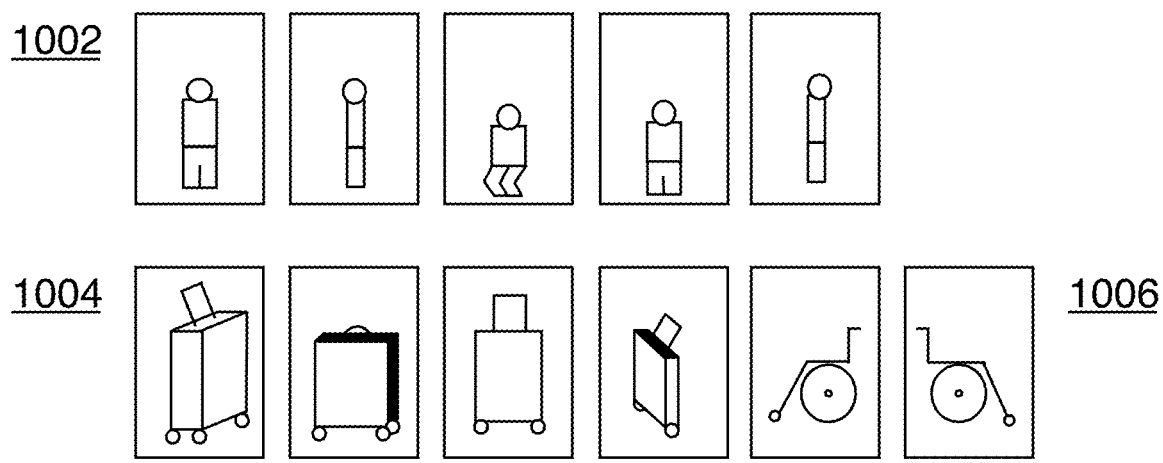
Fig. 11
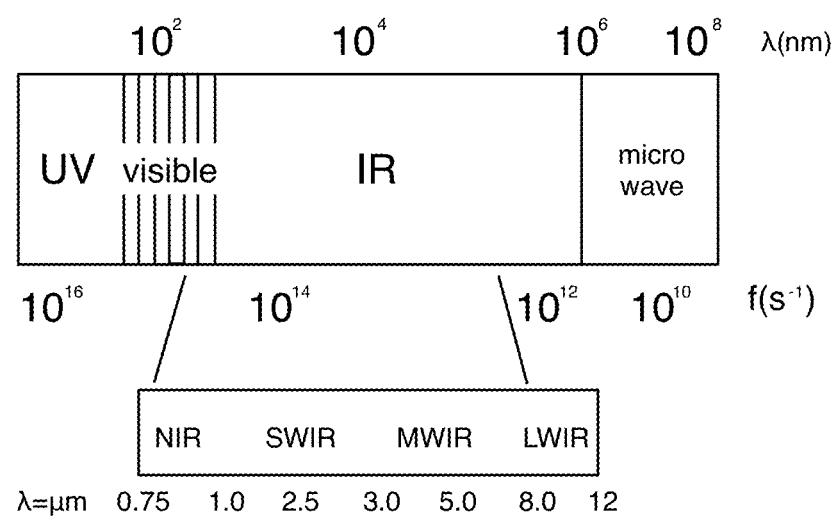

Fig. 12 - Airport Vehicle Tracking

Fig. 13 - airport wayfinder for passenger/vehicle

Fig. 14 - external data sources 1602
1604

1606

1608

1702

1704

1706
1708
1710
1712
1714

Fig. 18 - overflow parking
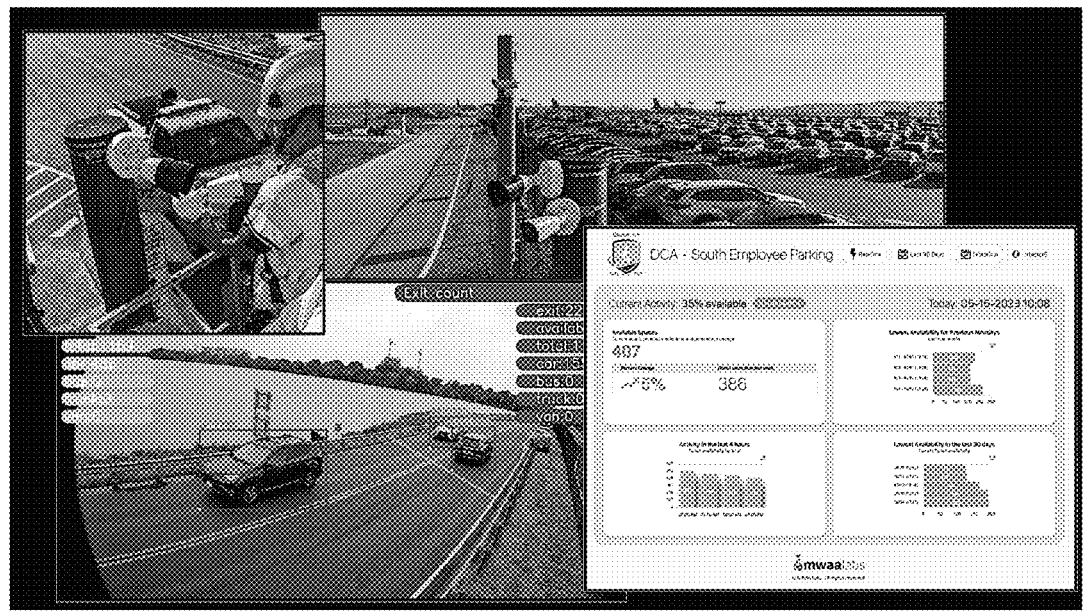
Fig. 19 - security wait time
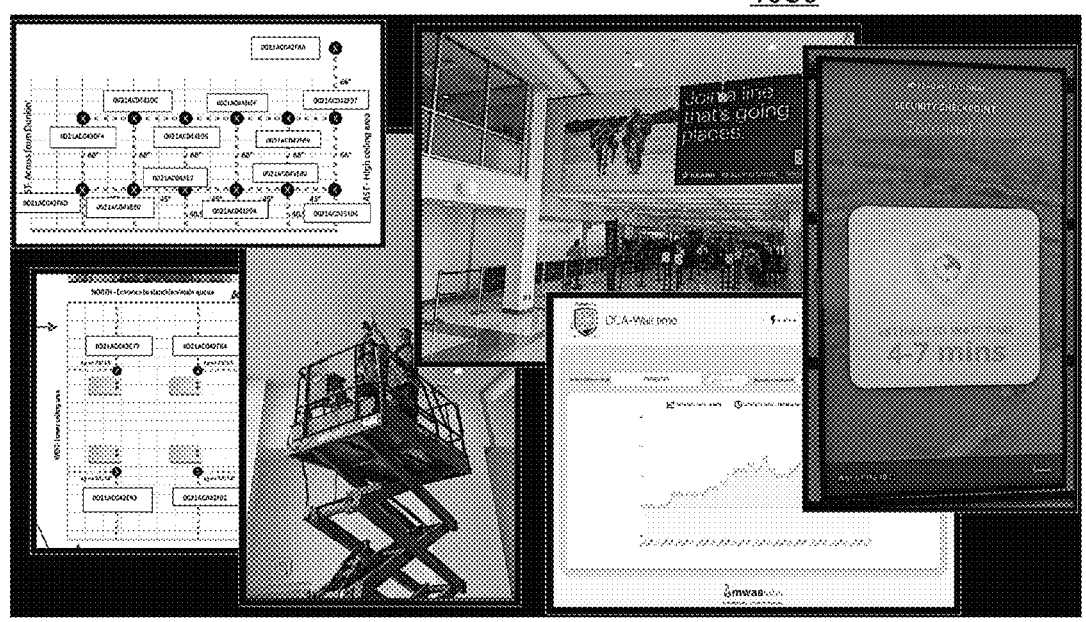

COMPUTER-IMPLEMENTED SYSTEM AND METHOD TO TRACK, MONITOR, STORE, AND REPORT THE LOCATION AND DWELL TIME OF AIRPORT PASSENGERS AND VEHICLES AT AIRPORT CHECKPOINTS AND FACILITIES

FIELD OF THE INVENTION

The invention relates to a computer-implemented system and method for managing human and vehicle traffic in an airport, and in particular to using a combined system for passengers and airport asset, to track, monitor, store, and report on dwell times of passengers at airport security checkpoints and locations, and to track, monitor, store, and report on the location of airport vehicles and mobile assets using cameras in combination with GPS transponders.

BACKGROUND

U.S. Pat. No. 10,207,193 discloses an Optical Tracking System for Automation of Amusement Park Elements having a dynamic signal to noise ratio tracking system to enable detection of people within the field of view of the tracking system. The tracking system uses an emitter configured to emit electromagnetic radiation in an area, a detector to detect reflected signal back from people and/or objects in the area, and a control unit to evaluate signals from the detector and control various automated amusement park equipment as a result of this evaluation, U.S. Pat. No. 10,187,753 discloses a Queue information and prediction method and apparatus that uses the probability of queue existing in a given venue to assess the queue time. The instantaneous queue time for a location may be determined using Bluetooth, Wi-Fi, or other wireless networks. QIPS uses the distances from signal strengths along with venue characteristics to determine an estimated queue time. Using queue probability for a venue and the instantaneous queue time for the same area QIPS may generate a Queue Decision Window (QDW). The QDW is a period of time leading up to a transaction or a consumption of a service. QIPS sorts through information surrounding a venue where crowds as well as queues may exist to determine queue time. Knowing the approximate queue time for transactions and consumption of services is helpful for consumers to manage their time.

Accordingly, there remains a need for a method and system for tracking and reporting in real time the location of objects e.g. vehicles, mobile assets, and passengers, and monitoring wait times at security checkpoints and locations in an airport.

SUMMARY OF THE INVENTION

In accordance with an embodiment of the present disclosure, the invention describes a computer implemented method for using a combined camera and GPS system to track, monitor, store, and report on locations and dwell times of airport objects comprising passengers, vehicles and mobile assets at airport security checkpoints and other airport-controlled locations using programming instructions saved to memory and executable on a processor, comprising the steps:

receiving airport object data associated with one or more passengers, vehicles and mobile assets at airport security checkpoints via an CF Network for container-to-container networking with a QueueHub VRF module for virtual routing and forwarding that provides connection and communication between one or more box and bullet network cameras, one or more vision and time of flight sensors, and one or more GPS and mobile transponders mounted on said vehicles and mobile assets configured to communicate with orbiting satellites and with a cellular network antenna;

assigning MQTT topics to each of said cameras, sensors, and GPS and mobile transponders using an internal network Cloud Provider having a Python Middleware and a MQTT Broker with MQTT Protocol that is in communication with the CF Network with the QueueHub VRF module, the Python Middleware is in communication with MQTT topics from the box and bullet network cameras, the vision and time of flight sensors, and the GPS and mobile transponders; the MQTT Broker tracks and communicates with connected devices using the MQTT topics for cameras, sensors, and GPS and mobile transponders;

receiving airport object data at a Real-time database (DB) using a DB Cloud Provider in communication with the cameras, sensors, and GPS and mobile transponders, using the internal network Cloud Provider, middleware and MQTT broker;

managing integration of airport object data for web, mobile, and digital display using a Nodejs Middleware housed at a Nodejs Cloud Provider that is connected to the Real-time DB, the Nodejs Middleware in communication with a Socket.io module, a REST API module, and a Scheduler module, a REACT QueueHub App Dashboard is connected to the Nodejs middleware thru the Socket.io module, the REACT QueueHub App dashboard connects to a Route Protection module through a Keycloak (IAM) module, one or more Front-end clients for web, mobile, digital display are connected to the Route Protection module through a Basic Authentication module, the Route protection module is connected to the Nodejs middleware through the REST API module, the Scheduler module is connected to a data warehouse and then to the Front-end clients; and Outputting predicted values to the Front-end clients using a Model Building module for predictive modeling that receives historical data from the Data warehouse, and outputs Predicted Values from the Data warehouse to the Front-end clients.

In accordance with an embodiment of the present disclosure, the invention describes a computer implemented system for using a combined camera and GPS system to track, monitor, store, and report on locations and dwell times of airport objects comprising passengers, vehicles and mobile assets at airport security checkpoints and other airport-controlled locations using programming instructions saved to memory and executable on a processor, comprising:

a CF Network for container-to-container networking with a QueueHub VRF module for virtual routing and forwarding that provides connection and communication between one or more box and bullet network cameras, one or more vision and time of flight sensors, and one or more GPS and mobile transponders mounted on a vehicle; the cameras, sensors, and GPS and mobile transponders assigned with MQTT topics; the GPS and mobile transponders configured to communicate with orbiting satellites and with a cellular network antenna;

an internal network Cloud Provider having Python Middleware and Broker-MQTT Protocol is in communication with the CF Network with the QueueHub VRF module, the Python Middleware is in communication with MQTT topics from the box and bullet network cameras, the vision and time of flight sensors, and the GPS and mobile transponders; an MQTT Broker tracks and communicates with connected devices using the MQTT topics for cameras, sensors, and GPS and mobile transponders;

a Real-time database (DB) using a DB Cloud Provider receives feeds from cameras, sensors, and GPS and mobile transponders, using the internal network Cloud Provider, middleware and MQTT broker;

a Nodejs Middleware housed at a Nodejs Cloud Provider is connected to the Real-time DB, the Nodejs Middleware manages various integrations for web, mobile, and digital display;

a Socket.io module, a REST API module, and a Scheduler module are in communication with the Nodejs Middleware, a REACT QueueHub App Dashboard is connected to the Nodejs middleware thru the Socket.io module, the REACT QueueHub App dashboard connects to a Route Protection module through a Keycloak (IAM) module, one or more Front-end clients for web, mobile, digital display, are connected to the Route Protection module through a Basic Authentication module, the Route protection module is connected to the Nodejs middleware through the REST API module, the Scheduler module is connected to a data warehouse and then to the Front-end clients; and a Model Building module for predictive modelling receives historical data from the Data warehouse, and outputs Predicted Values to the Front-end clients.

In accordance with an embodiment of the present disclosure, the invention describes a computer-implemented system and method for managing human and vehicle traffic in an airport, and in particular to using a combined system of cameras and GPS transponders to track, monitor, store, and report on the location and dwell times of airport objects (passengers, vehicles and mobile assets) at airport security checkpoints and airport controlled locations.

In accordance with another embodiment of the present disclosure, the invention describes a computer-implemented method for managing airport object data (human and vehicle) traffic in an airport, and in particular to using a combined camera and GPS system to track, monitor, store, and report on locations of airport objects (passengers, vehicles and mobile assets) as well as track, monitor, store, and report on dwell times of airport objects at airport security checkpoints and other airport-controlled locations, comprising the steps:

a. Receiving airport object camera data associated with at least one security checkpoint waiting area in the airport via an MQTT camera client publisher module in communication with at least one camera, and converting said airport object data to JSON format, wherein said airport object camera data is airport passenger data, airport vehicle data, or both, said airport object camera data comprising the security checkpoint waiting area ($A_S$), an airport object (vehicle or passenger) time of entry ($T_{IN}$) into the security checkpoint waiting area, an airport object (vehicle or passenger) time of exit ($T_{OUT}$) from the security checkpoint waiting area, and a time-registered airport object (vehicle or passenger) coordinate ($P_{XYT}$) within the security checkpoint waiting area at periodic time intervals ($T_{n+1}$), wherein said camera is configured with calibration programming instructions to receive infrared or electromagnetic spectrum radiation of an airport object (vehicle or passenger), to capture the airport object data, to remove background signals from the airport object data, and wherein said camera is configured with privacy-screening programming instructions for applying a face blur to eliminate personally identifiable information from the airport object data;

b. Receiving airport object GPS data associated with at least one airport vehicle object at a security checkpoint waiting area in the airport via an MQTT camera client publisher module in communication with at least one GPS transponder attached to the airport vehicle object, and converting said airport vehicle object GPS data to JSON format, c. Receiving combined JSON format airport object data comprising the JSON format airport object data and the JSON format airport object GPS data, at an online MQTT Broker of an MQTT Python Server via the MQTT client publisher module of the camera and via the MQTT client publisher module of the GPS transponder, said MQTT Broker establishing MQTT Topics associated with the JSON airport object data, said MQTT Topics comprising a Security Checkpoint ($A_S$) Topic, a Security Checkpoint Analyzed ($A_{S-A}$) Topic, an airport object time of entry ($T_{IN}$) Topic, an airport object time of entry Analyzed ($T_{IN-A}$) Topic, an airport object time of exit ($T_{OUT}$) Topic, an airport object time of exit Analyzed ($T_{OUT}$) Topic, a time-registered airport object coordinates ($P_{XYT}$) Topic, a time-registered airport object coordinates Analyzed ($P_{XYT-A}$) Topic, and an airport object wait time ($T_{OUT}$-$T_{IN}$) Topic;

said MQTT Python Server configured with programming instructions to publish, subscribe, unsubscribe, and process the JSON airport object data, said MQTT Python Server having a library of scripts for publishing, subscribing, unsubscribing, and processing the MQTT messages;

d. Receiving the JSON format airport object data at a storage database server (Mongo DB) in communication with the MQTT Python Server, the storage database server is configured with application programming code to receive the JSON format airport object data, to store the JSON format airport object data, to provide subscriber-client access to the MQTT Topics, to manage time-series data, and to process the JSON format airport object data to generate a calculated wait time data ($T_{OUT}$-$T_{IN}$) for each airport object, and a time-registered airport object coordinate data ($P_{XYT-A}$) for analyzing airport object wait time between each x-y coordinate of the airport object through the security checkpoint waiting area;

e. Subscribing to the MQTT Topics of the JSON format airport object data via a Node.js Server in communication with the MQTT Broker, the Node.js Server is configured with application programming code to provide subscriber-client access to the MQTT Topics associated with the JSON format airport object data, to transmit, store, and manage the JSON format airport object data, the calculated wait time data ($T_{OUT}$-$T_{IN}$) for each airport object, and the time-registered airport object coordinates data ($P_{XYT-A}$) for analyzing airport object wait time between each x-y coordinate of the airport object through the security checkpoint waiting area, the Node.js Server is configured with application programming code to use the JSON format airport object data to generate at least three specific reports comprising a Wait time historical report, a Collection clean up report, and an airport object coordinates report, wherein the Node.js server is in communication with a Scheduler module, wherein the Scheduler receives the at least three specific reports from the Node.js Server, the Node.js Server is configured with application programming code to create an instance of an HTTP server to handle requests, issue responses, save assets and files, play media, create directories, provide interaction between users and the Node.js server, to continue running by restarting after a crash or reboot, the Node Server is configured with application programming code to communicate and transmit to and from a Rest API application, a Socket.io application, and a Route Protection module;

f. Receiving the JSON format airport object data at a Rest API module (representational (RE) state(S) transfer (T), Application Programming Interface) in communication with the Node.js Server, the Rest API module is configured with application programming code to provide a set of rules to define how applications or devices connect to and communicate with each other, the REST API is configured with application programming code to use Uniform Resource Identifiers (URIs) to provide access to resources comprising the JSON format airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control;

g. Receiving the JSON format airport object data at a Socket.IO module in communication with the Node.js Server, the Socket.IO module is configured with application programming code to provide a library that enables low-latency, bidirectional and event-based communication between a REACT router client and the Node.js Server, said Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser;

h. Receiving the JSON format airport object data at a Route protection-Keycloak Server in communication with the Node.js Server, the Route protection-Keycloak Server is configured with application programming code to provide a single sign-on security solution for web access and REST API web services to protect application communications on multiple platforms and multiple technology stacks using OpenID Connect and SAML protocols;

i. Receiving the JSON format airport object data at the React Router client in communication with the Socket.IO module, the React Router client is configured with application programming code to provide a routing library for a React Server, to enable navigation among views of various components in a React Application, to allow changing the browser URL, and to keep a user interface (UI) in sync with an associated URL, the React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only;

j. Receiving the JSON format airport object data at multiple display screens via the React Router, the multiple display screens in communication with the React Router and the multiple display screens and the React Router are configured with application programming code to provide transmit JSON format airport object data, the multiple display screens comprising a real-time queue display screen, a real-time operations analysis display screen, a real-time mobile app display screen, and an analytical report display screen;

k. Receiving the JSON format airport object data at a Scheduler module in communication with the Node.js Server, the Scheduler module is configured with application programming code to trigger a JavaScript function at our specified time or interval to run a job or a task at regular intervals or at a specified time, one of said JS functions is to generate historical analytical reports of the JSON format airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution; and l. Receiving the JSON format airport object data at a Data Warehouse (My SQL) in communication with the Scheduler module, the Data Warehouse is configured with application programming code to provide a data management system to enable and support analytics and to perform queries and analysis of large amounts of historical JSON format airport object data, the the Data Warehouse is configured with application programming code to also provide analytical reports associated with MQTT Topics comprising an analytical report on usage of a particular Security Checkpoint ($A_S$), and Security Checkpoint Analyzed ($A_{S-A}$), an analytical report on airport object time of entry ($T_{IN}$), and airport object time of entry Analyzed ($T_{IN-A}$), an analytical report on airport object time of exit ($T_{OUT}$), and airport object time of exit Analyzed ($T_{OUT}$), an analytical report on time-registered airport object coordinates ($P_{XYT}$), and time-registered airport object coordinates Analyzed ($P_{XYT-A}$) for analyzing airport object wait time between each x-y coordinate of the airport object through the security checkpoint waiting area, and an analytical report for airport object wait times ($T_{OUT}-T_{IN}$) within the security checkpoint boundary area.

In accordance with another embodiment of the present disclosure, the invention also describes a computer-implemented system for using a combined camera and GPS system to track, monitor, store, and report on locations of airport objects (passengers, vehicles and mobile assets) as well as to track, monitor, store, and report on dwell times of airport objects at airport security checkpoints and other airport-controlled locations, comprising:

a. At least one airport object camera associated with at least one security checkpoint waiting area in the airport configured for receiving airport object camera data, an MQTT camera client publisher module in communication with the at least one airport object camera, said airport object camera data converted to JSON format, said airport object camera data comprising the security checkpoint waiting area ($A_S$), an airport object time of entry ($T_{IN}$) into a security checkpoint waiting area, an airport object time of exit ($T_{OUT}$) from the security checkpoint waiting area, and time-registered airport object coordinates ($P_{XYT}$) within the security checkpoint waiting area at periodic time intervals ($T_{n+1}$), wherein said camera is configured with calibration programming instructions to receive infrared spectrum radiation of an airport object to capture airport object data and remove background signals from the airport object data, and wherein said camera is configured with privacy-screening programming instructions for applying a face blur to eliminate personally identifiable information from said airport object data;

b. at least one GPS transponder attached to the airport vehicle object in communication with an MQTT camera client publisher module configured to receive airport object GPS data associated with the airport vehicle object at a security checkpoint waiting area in the airport, and convert said airport vehicle object GPS data to JSON format, c. an online MQTT Broker of an MQTT Python Server in communication with the MQTT client publisher module of the camera configured for combined JSON format airport object data comprising the JSON format airport object data and the JSON format airport object GPS data, said MQTT Broker establishing MQTT Topics associated with the airport object data, said MQTT Topics comprising a Security Checkpoint ($A_S$) Topic, a Security Checkpoint Analyzed ($A_{S-A}$) Topic, an airport object time of entry ($T_{IN}$) Topic, an airport object time of entry Analyzed ($T_{IN-A}$) Topic, an airport object time of exit ($T_{OUT}$) Topic, an airport object time of exit Analyzed ($T_{OUT}$) Topic, a time-registered airport object coordinates ($P_{XYT}$) Topic, a time-registered airport object coordinates Analyzed ($P_{XYT-A}$) Topic, and a airport object wait time ($T_{OUT}$-$T_{IN}$) Topic; said MQTT Python Server configured with programming instructions to publish, subscribe, unsubscribe, and process the airport object data, said MQTT Python Server having a library of scripts for publishing, subscribing, unsubscribing, and processing the MQTT messages;

d. a storage database server (Mongo DB) in communication with the MQTT Python Server, the storage database server is configured with application programming code to receive the airport object data, to store the airport object data, to provide subscriber-client access to the MQTT Topics, to manage time-series data, and to process the airport object data to generate a calculated wait time data ($T_{OUT}$-$T_{IN}$) for each airport object, and a time-registered airport object coordinates data ($P_{XYT-A}$) for analyzing airport object wait time between each x-y coordinate of the airport object through the security checkpoint waiting area;

e. a Node.js Server in communication with the MQTT Broker configured for subscribing to the MQTT Topics of the airport object data, the Node.js Server is configured with application programming code to provide subscriber-client access to the MQTT Topics associated with the airport object data, to transmit, store, and manage the airport object data, the calculated wait time data ($T_{OUT}$-$T_{IN}$) for each airport object, and the time-registered airport object coordinates data ($P_{XYT-A}$) for analyzing airport object wait time between each x-y coordinate of the airport object through the security checkpoint waiting area, the Node.js Server is configured with application programming code to use the airport object data to generate at least three specific reports comprising a Wait time historical report, a Collection clean up report, and a airport object coordinates report, wherein the Node.js server is in communication with a Scheduler module, wherein the Scheduler receives the at least three specific reports from the Node.js Server, the Node.js Server is configured with application programming code to create an instance of an HTTP server to handle requests, issue responses, save assets and files, play media, create directories, provide interaction between users and the Node.js server, to continue running by restarting after a crash or reboot, the Node Server is configured with application programming code to communicate and transmit to and from a Rest API application, a Socket.io application, and a Route Protection module;

f. a REST API module (representational (RE) state(S) transfer (T), Application Programming Interface) in communication with the Node.js Server, the REST API module is configured with application programming code for receiving the airport object data, and to provide a set of rules to define how applications, clients, and servers connect to and communicate with each other, the REST API is configured with application programming code to use Uniform Resource Identifiers (URIs) to provide access to resources comprising the airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control;

g. a Socket.IO module in communication with the Node.js Server, the Socket.IO module is configured with application programming code for receiving the airport object data, and to provide a library that enables low-latency, bidirectional and event-based communication between a REACT router client and the Node.js Server, said Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser;

h. a Route protection-Keycloak Server in communication with the Node.js Server, the Route protection-Keycloak Server is configured with application programming code for receiving the airport object data, and to provide a single sign-on security solution for web access and REST API web services to protect application communications on multiple platforms and multiple technology stacks using OpenID Connect and SAML protocols;

i. a React Router client in communication with the Socket.IO module, the React Router client is configured with application programming code for receiving the airport object data, and to provide a routing library for a React Server, to enable navigation among views of various components in a React Application, to allow changing the browser URL, and to keep a user interface (UI) in sync with an associated URL, the React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only;

j. multiple display screens in communication with the React Router, the multiple display screens and the React Router are configured with application programming code for receiving airport object data and to transmit airport object data to the multiple display screens, the multiple display screens comprising a real-time queue display screen, a real-time operations analysis display screen, a real-time mobile app display screen, and an analytical report display screen;

k. a Scheduler module in communication with the Node.js Server, the Scheduler module is configured with application programming code for receiving airport object data and to trigger a JavaScript function at our specified time or interval to run a job or a task at regular intervals or at a specified time, one of said JS functions is to generate historical analytical reports of the airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution; and l. a Data Warehouse (My SQL) in communication with the Scheduler module, the Data Warehouse is configured with application programming code for receiving airport object data and to provide a data management system to enable and support analytics and to perform queries and analysis of large amounts of historical airport object data, the the Data Warehouse is configured with application programming code to also provide analytical reports associated with MQTT Topics comprising an analytical report on usage of a particular Security Checkpoint ($A_S$), and Security Checkpoint Analyzed ($A_S.A$), an analytical report on airport object time of entry ($T_{IN}$), and airport object time of entry Analyzed ($T_{IN-A}$), an analytical report on airport object time of exit ($T_{OUT}$), and airport object time of exit Analyzed ($T_{OUT}$), an analytical report on time-registered airport object coordinates ($P_{XYT}$), and time-registered airport object coordinates Analyzed ($P_{XYT-A}$) for analyzing airport object wait time between each x-y coordinate of the airport object through the security checkpoint waiting area, and an analytical report for airport object wait times ($T_{OUT}-T_{IN}$) within the security checkpoint boundary area.

BRIEF DESCRIPTION OF THE FIGURES

These and other features, aspects, and advantages of the present disclosure will become better understood when the following detailed description is read with reference to the accompanying drawings in which like characters represent like parts throughout the drawings, wherein:

FIG. 4 shows that a passenger waiting area can be defined according to X and Y coordinates.

FIG. 6 shows a time series progression of the movement of the passenger through the passenger waiting area.

FIG. 10 is an illustration of a trained alignment database showing how a camera can distinguish people objects from non people objects in a passenger waiting line at a security checkpoint.

FIG. 11 is an illustration showing the infrared spectrum wavelengths that can be used in thermal and radiographic (IR) cameras.

FIG. 18 is a screenshot showing images from a series of cameras at an overflow parking lot and from display screens. The images show how cameras with advanced recognition functions and programming can tally the number of available parking spaces, the number and type of cars entering and exiting the parking facility, and can provide analytical reports on activity and availability over specified time periods, as well the number of cars, buses, trucks, and vans, according to the method and system of the invention.

FIG. 19 is a screenshot showing images from a series of cameras at an airport checkpoint and from display screens. The images show how cameras with advanced recognition functions and programming can identify passengers in a security queue and can calculate and publish wait times in specified periods, including daily and hourly, and can track and report average wait times and track and report the longest wait time, according to the method and system of the invention.

DETAILED DESCRIPTION OF THE INVENTION

Preferred Embodiments

Figure 1:
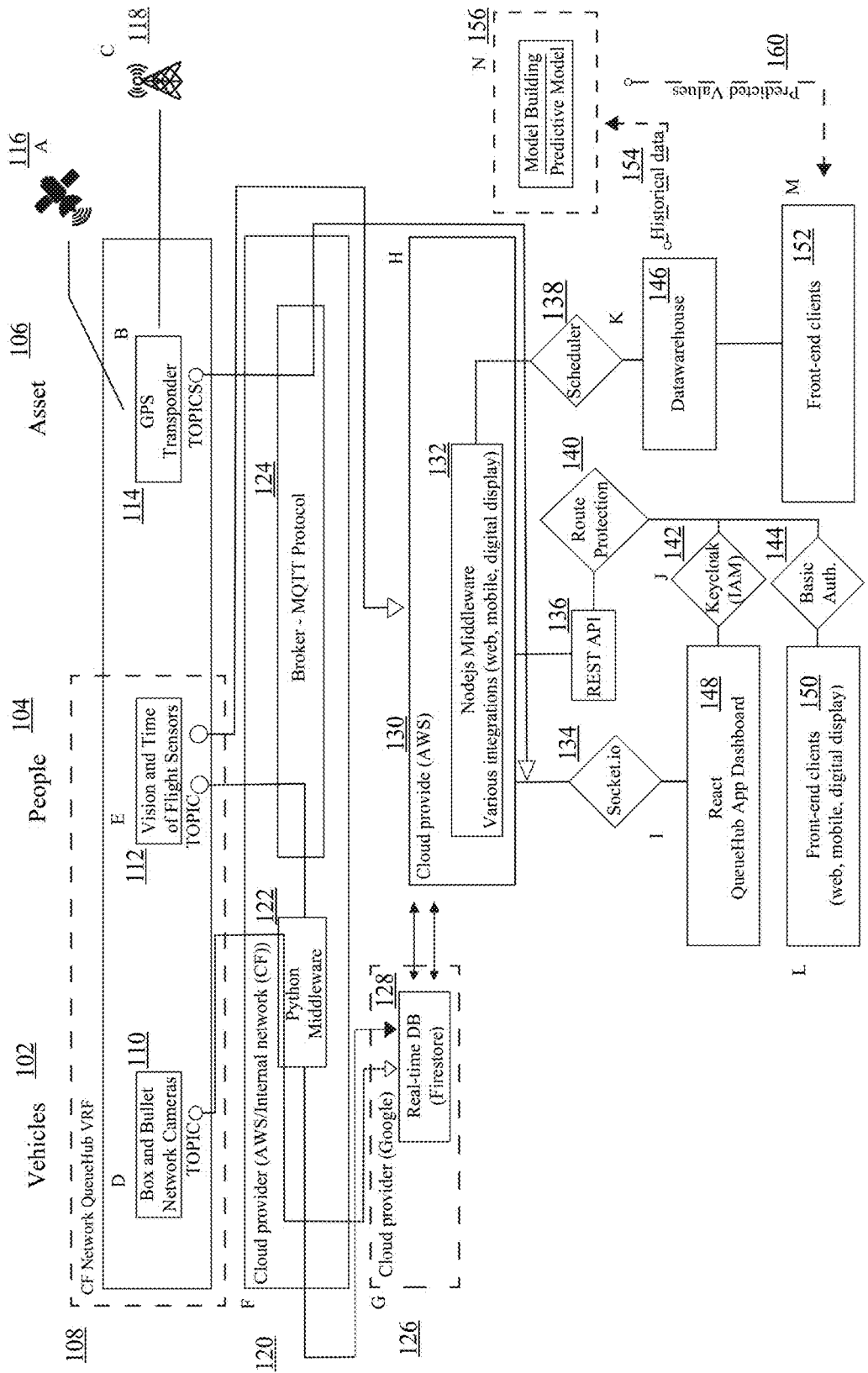
FIG. 1 is a schematic representation of an embodiment of the architecture, according to the present invention.

In a preferred embodiment, the invention provides a computer-implemented method for managing object (vehicle or passenger) wait times at security checkpoints in an airport, comprising the steps:

a. Receiving camera data associated with at least one security checkpoint waiting area in the airport via an MQTT camera client publisher module in communication with at least one camera, b. Receiving object (vehicle or passenger) data at an online MQTT Broker of an MQTT Python Server via the MQTT client publisher module of the camera, c. Receiving the object (vehicle or passenger) data at a storage database server (Mongo DB) in communication with the MQTT Python Server, d. Subscribing to MQTT Topics of the object (vehicle or passenger) data via a Node.js Server in communication with the MQTT Broker, e. Receiving the object (vehicle or passenger) data at a Rest API module (representational (RE) state(S) transfer (T), Application Programming Interface) in communication with the Node.js Server, f. Receiving the object (vehicle or passenger) data at a Socket.IO module in communication with the Node.js Server, g. Receiving the object (vehicle or passenger) data at a Route protection-Keycloak Server in communication with the Node.js Server, h. Receiving the object (vehicle or passenger) data at the React Router client in communication with the Socket.IO module, i. Receiving object (vehicle or passenger) data at a multiple display screens via the React Router, j. Receiving object (vehicle or passenger) data at a Scheduler module in communication with the Node.js Server; and k. Receiving object (vehicle or passenger) data at a Data Warehouse (My SQL) in communication with the Scheduler module.

In another preferred embodiment, the invention provides a computer-implemented system for managing object (vehicle or passenger) wait times at security checkpoints in an airport, comprising:

a. At least one camera associated with at least one security checkpoint waiting area in the airport configured for receiving camera data, an MQTT camera client publisher module in communication with the at least one camera, b. An online MQTT Broker of an MQTT Python Server in communication with the MQTT client publisher module of the camera configured for receiving object (vehicle or passenger) data, said MQTT Broker establishing MQTT Topics associated with the object (vehicle or passenger) data, said MQTT Topics comprising a Security Checkpoint ($A_S$) Topic, a Security Checkpoint Analyzed ($A_{S-A}$) Topic, a object (vehicle or passenger) time of entry ($T_{IN}$) Topic, a object (vehicle or passenger) time of entry Analyzed ($T_{IN-A}$) Topic, a object (vehicle or passenger) time of exit ($T_{OUT}$) Topic, a object (vehicle or passenger) time of exit Analyzed ($T_{OUT}$) Topic, a time-registered object (vehicle or passenger) coordinates ($P_{XYT}$) Topic, a time-registered object (vehicle or passenger) coordinates Analyzed ($P_{XYT-A}$) Topic, and a object (vehicle or passenger) wait time ($T_{OUT}-T_{IN}$) Topic;

said MQTT Python Server configured with programming instructions to publish, subscribe, unsubscribe, and process the object (vehicle or passenger) data, said MQTT Python Server having a library of scripts for publishing, subscribing, unsubscribing, and processing the MQTT messages;

c. A storage database server (Mongo DB) in communication with the MQTT Python Server, the storage database server is configured with application programming code to receive the object (vehicle or passenger) data (or object (vehicle or passenger) coordinates data), to store the object (vehicle or passenger) data, to provide subscriber-client access to the MQTT Topics, to manage time-series data, and to process the object (vehicle or passenger) data to generate a calculated wait time data ($T_{OUT}$-$T_{IN}$) for each object (vehicle or passenger), and a time-registered object (vehicle or passenger) coordinates data ($P_{XYT-A}$) for analyzing object (vehicle or passenger) wait time between each x-y coordinate of a object (vehicle or passenger) through the security checkpoint waiting area;

d. a Node.js Server in communication with the MQTT Broker configured for subscribing to the MQTT Topics of the object (vehicle or passenger) data, the Node.js Server is configured with application programming code to provide subscriber-client access to the MQTT Topics associated with the object (vehicle or passenger) data, to transmit, store, and manage the object (vehicle or passenger) data (or object (vehicle or passenger) coordinates data), the calculated wait time data ($T_{OUT}$-$T_{IN}$) for each object (vehicle or passenger), and the time-registered object (vehicle or passenger) coordinates data ($P_{XYT-A}$) for analyzing object (vehicle or passenger) wait time between each x-y coordinate of a object (vehicle or passenger) through the security checkpoint waiting area;

e. a REST API module (representational (RE) state(S) transfer (T), Application Programming Interface) in communication with the Node.js Server, the REST API module is configured with application programming code for receiving the object (vehicle or passenger) data, and to provide a set of rules to define how applications, clients, and servers connect to and communicate with each other;

f. a Socket.IO module in communication with the Node.js Server, the Socket.IO module is configured with application programming code for receiving the object (vehicle or passenger) data, and to provide a library that enables low-latency, bidirectional and event-based communication between a REACT router client and the Node.js Server;

g. a Route protection-Keycloak Server in communication with the Node.js Server, the Route protection-Keycloak Server is configured with application programming code for receiving the object (vehicle or passenger) data, and to provide a single sign-on security solution for web access;

h. a React Router client in communication with the Socket.IO module, the React Router client is configured with application programming code for receiving the object (vehicle or passenger) data, and to provide a routing library for a React Server, to enable navigation among views of various components in a React Application, to allow changing the browser URL, and to keep a user interface (UI) in sync with an associated URL;

i. multiple display screens in communication with the React Router, the multiple display screens and the React Router are configured with application programming code for receiving object (vehicle or passenger) data and to transmit object (vehicle or passenger) data to the multiple display screens;

j. a Scheduler module in communication with the Node.js Server, the Scheduler module is configured with application programming code for receiving object (vehicle or passenger) data and to trigger a JavaScript function at our specified time or interval to run a job or a task at regular intervals or at a specified time; and k. a Data Warehouse (My SQL) in communication with the Scheduler module, the Data Warehouse is configured with application programming code for receiving object (vehicle or passenger) data and to provide a data management system to enable and support analytics and to perform queries and analysis of large amounts of historical object (vehicle or passenger) data, Any of the preferred methods and systems herein may include wherein said camera data comprising the security checkpoint waiting area ($A_S$), a object (vehicle or passenger) time of entry ($T_{IN}$) into a security checkpoint waiting area, a object (vehicle or passenger) time of exit ($T_{OUT}$) from the security checkpoint waiting area, and time-registered object (vehicle or passenger) coordinates ($P_{XYT}$) within the security checkpoint waiting area at periodic time intervals ($T_{n+1}$).

Any of the preferred methods and systems herein may include wherein said camera is configured with calibration programming instructions to receive infrared spectrum radiation of a object (vehicle or passenger) to capture object (vehicle or passenger) data and remove background signals, said object (vehicle or passenger) data converted to JSON format.

Any of the preferred methods and systems herein may include wherein said calibration programming instructions capable of calibrating the camera to human skin temperature, said background thermal radiation selected from an empty security checkpoint and from non-object (vehicle or passenger) objects, said non-object (vehicle or passenger) objects selected from a travel bag or luggage, a wheelchair, a stroller, and a pet carrier, and Any of the preferred methods and systems herein may include wherein said camera is configured with privacy-screening programming instructions for applying a face blur to eliminate personally identifiable information from said object (vehicle or passenger) data.

Any of the preferred methods and systems herein may include wherein the Node.js Server is configured with application programming code to use the object (vehicle or passenger) data to generate at least three specific reports comprising a Wait time historical report, a Collection clean up report, and a object (vehicle or passenger) coordinates report, wherein the Node.js server is in communication with a Scheduler module, wherein the Scheduler receives the at least three specific reports from the Node.js Server, the Node.js Server is configured with application programming code to create an instance of an HTTP server to handle requests, issue responses, save assets and files, play media, create directories, provide interaction between users and the Node.js server, to continue running by restarting after a crash or reboot, the Node Server is configured with application programming code to communicate and transmit to and from a Rest API application, a Socket.io application, and a Route Protection module.

Any of the preferred methods and systems herein may include wherein the REST API is configured with application programming code to use Uniform Resource Identifiers (URIs) to provide access to resources comprising the object (vehicle or passenger) data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control.

Any of the preferred methods and systems herein may include wherein said Socket.IO is built on top of the WebSocket communication protocol and provides one or more additional guarantees like fallback to HTTP long-polling and automatic reconnection, wherein a WebSocket module implements the WebSocket communication protocol to provide a full-duplex and low-latency channel between the Node.js Server and a client browser.

Any of the preferred methods and systems herein may include wherein REST API web services protect application communications on multiple platforms and multiple technology stacks using OpenID Connect and SAML protocols Any of the preferred methods and systems herein may include wherein the React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only.

Any of the preferred methods and systems herein may include wherein the multiple display screens comprising a real-time queue display screen, a real-time operations analysis display screen, a real-time mobile app display screen, and an analytical report display screen.

Any of the preferred methods and systems herein may include wherein one of said JS functions is to generate historical analytical reports of the object (vehicle or passenger) data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution.

Any of the preferred methods and systems herein may include wherein the Data Warehouse is configured with application programming code to also provide analytical reports associated with MQTT Topics comprising an analytical report on usage of a particular Security Checkpoint ($A_S$), and Security Checkpoint Analyzed ($A_{S-A}$), an analytical report on object (vehicle or passenger) time of entry ($T_{IN}$), and object (vehicle or passenger) time of entry Analyzed ($T_{IN-A}$), an analytical report on object (vehicle or passenger) time of exit ($T_{OUT}$), and object (vehicle or passenger) time of exit Analyzed ($T_{OUT}$), an analytical report on time-registered object (vehicle or passenger) coordinates ($P_{XYT}$), and time-registered object (vehicle or passenger) coordinates Analyzed ($P_{XYT-A}$) for analyzing object (vehicle or passenger) wait time between each x-y coordinate of a object (vehicle or passenger) through the security checkpoint waiting area, and an analytical report for object (vehicle or passenger) wait times ($T_{OUT}-T_{IN}$) within the security checkpoint boundary area.

Figure 2:
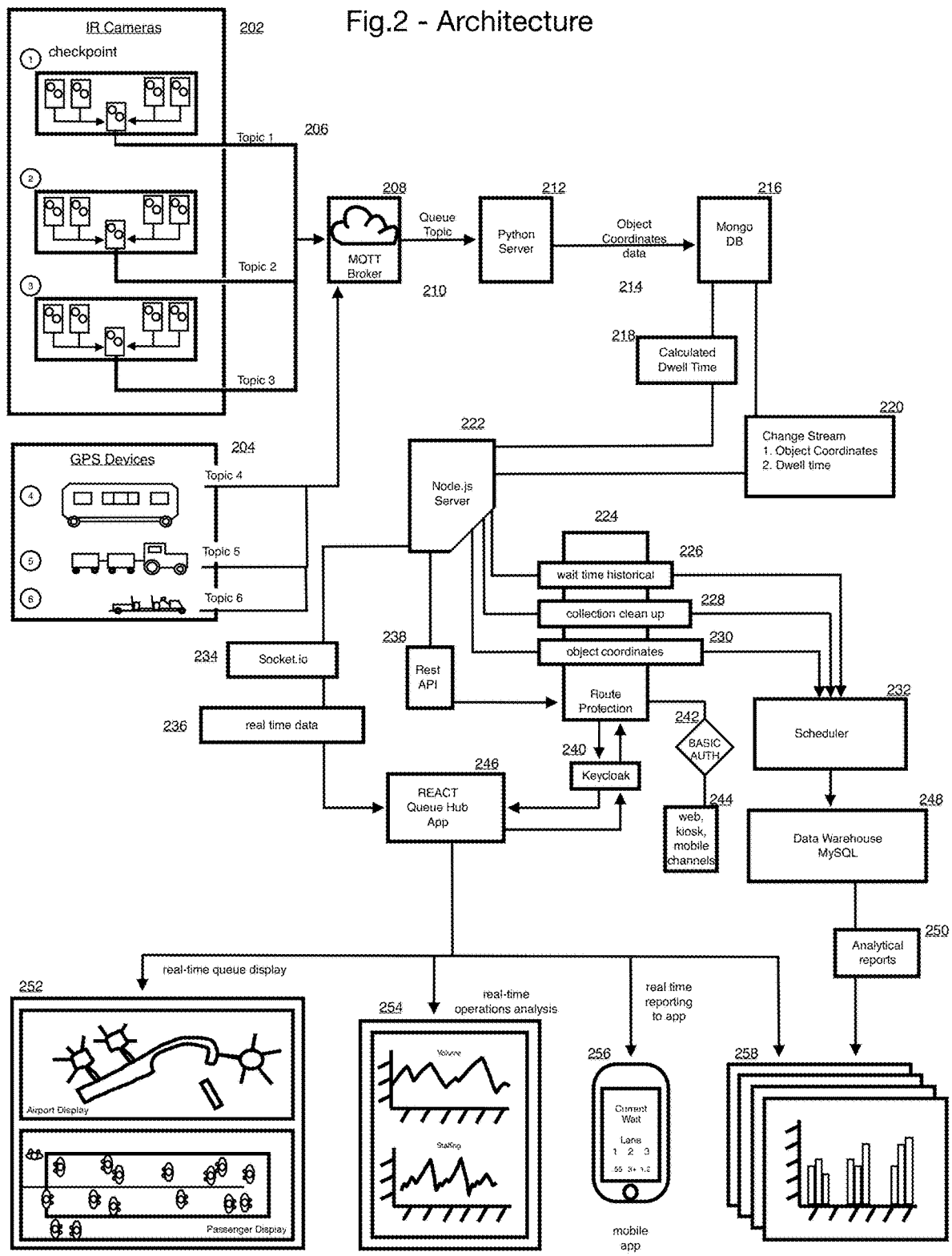
FIG. 2 is a schematic representation of another embodiment of the architecture, according to the present invention.

Referring now to the Figures, FIGS. 1 and 2 illustrate a system architecture having one or more cameras located at one or more security checkpoints in an airport.

FIG. 1 discloses a QueueHub application architecture for managing vehicles 102, people 104, and assets 106. A CF Network with QueueHub VRF 108 (container-to-container networking) with (virtual routing and forwarding) provides connection ad communication between box and bullet network cameras 110 and the vision and time of flight sensors 112. The cameras 110 and sensors 112 are assigned MQTT topics along with the GPS transponders 114. GPS transponders 114 communicate with orbiting satellites 116 and cellular antennas 118.

FIG. 1 discloses Cloud Provider 120 (AWS/internal network (CF)) having Python Middleware 122 and Broker-MQTT Protocol 124. Python Middleware 122 is in communication with topics from the box and bullet network cameras 110 and the vision and time of flight sensors 112. MQTT Broker 124 tracks and communicates with connected devices using topics, with topics for cameras 110, sensors 112, and GPS 114. Real-time database (DB) Firestore 128 using a Cloud Provider 126 such as Google™ receives feeds from cameras 110 and sensors 112 thru internal network 120, middleware 122 and broker 124. Real-time DB 128 connects to Nodejs Middleware 132 housed at a Cloud Provider 130 (AWS). The Nodejs Middleware 132 manages various integrations for web, mobile, and digital display.

FIG. 1 discloses Socket.io 134, REST API 136, and Scheduler 138 in communication with Nodejs Middleware 132. REACT QueueHub App Dashboard 148 connects to Nodejs middleware 132 thru Socket.io 134. REACT App dashboard 148 connects to Route Protection 140 through Keycloak (IAM) 142. Front-end clients 150, web, mobile, digital display, connects to Route Protection 140 through Basic Auth 144. Route protection module 140 connects to the Nodejs middleware 132 through REST PI 136. Scheduler 138 also connects to data warehouse 146 and then to Front-end clients 152.

Model Building module 156 for predictive modelling receives historical data 154 from the Data warehouse 146, and outputs Predicted Values 160 to Front-end clients 152. Cameras In a preferred non-limiting embodiment, the camera(s) is/are longwave infrared (IR), and has a spectral range of 8 μm to 14 μm. A longwave camera is appropriate for medium to long range observations. The camera has a lens with a preferred non-limiting range of 5-50 mm. The camera has a preferred non-limiting field of view (FOV) ranging from 6°-60° HFOV for width (H) and 6°-50° VFOV for vertical (V). In a preferred non-limiting embodiment, the FOV receives a radiation thermal signal that covers a waiting area from 5-30 meters in length and 5-20 meters wide. In a preferred non-limiting embodiment, the camera has a frame range of 30 Hz. The camera has a preferred non-limiting resolution ranging from 60 pixels to 1.2 Mp, and may include without limitation: 1080p (1920H×1080V), 1080p V×960p H, 976p H×508p V, 640×512 pixels, 384×288 pixels, 60×80, 1280×1024 pixels, and ranges, sub-ranges, and combinations thereof.

In a non-limiting preferred embodiment, the camera system uses an IP camera with IR night vision, such as that provided by Viewtron. In this non-limiting example, the camera has a CMOS image sensor with an image size 3840×2160 p (8 mp/4 k). The lens is 2.8 mm @ F2.0 providing a horizontal FoV of 112 degrees, vertical FoV of 79 degrees, and diagonal FoV of 118.6 degrees. In an alternate embodiment, the lens is 3.6 mm @ F2.2 providing a horizontal FoV of 89 degrees, vertical FoV of 57.8 degrees, and diagonal FOV of 96.8 degrees. The network interface is an RJ45 and it supports network protocols of UDP, IPv4, IPv6, DHCP, NTP, RTSP, PPPOE, DDNS, SMTP, FTP, 802.1x, UPnP, HTTP, HTTPS, and QoS. The IR distance ranges from 30-50 m.

In another non-limiting preferred embodiment, the camera system uses an IR camera such as the Vector 4D available from Irisys. In this example, the camera can detect passengers and not employees, eliminate lost counts or double counts, measure dwell time, and has the ability to connect up to 32 IR camera devices in a network without a separate server.

In a non-limiting preferred embodiment, the camera system uses an IP camera with visible light vision. In this non-limiting example, the camera has a CMOS image sensor with an image size 3840×2160 p (8 mp/4 k). The lens is 2.8 mm @ F2.0 providing a horizontal FoV of 112 degrees, vertical FoV of 79 degrees, and diagonal FoV of 118.6 degrees. In an alternate embodiment, the lens is 3.6 mm @ F2.2 providing a horizontal FoV of 89 degrees, vertical FoV of 57.8 degrees, and diagonal FoV of 96.8 degrees. The network interface is an RJ45 and it supports network protocols of UDP, IPv4, IPv6, DHCP, NTP, RTSP, PPPOE, DDNS, SMTP, FTP, 802.1x, UPnP, HTTP, HTTPs, and QoS. The visible light distance ranges from 30-150 m.

In a non-limiting preferred embodiment, the camera system uses advanced recognition components such as those available at Intenta GmbH. In such an example, the system includes a web interface, network setup menus and options, video streaming, digital output, and security features including authentication and encryption. The system may also include fault detection features, calibration for height, detection area, and background compensation. Data analysis features may also include dwell analysis, counters, height and direction violations, lost items, and so forth. Log files provide historical filters and reporting.

FIGS. 1 and 2 show at least one camera 110 and 202 associated with at least one security checkpoint waiting area 206 in the airport configured for receiving camera data, and GPS devices 204. The cameras and devices are in communication with an MQTT client publisher modules. The camera data comprises the security checkpoint waiting area ($A_S$), a passenger time of entry ($T_{IN}$) into a security checkpoint waiting area, a passenger time of exit ($T_{OUT}$) from the security checkpoint waiting area, and time-registered passenger coordinates ($P_{XYT}$) within the security checkpoint waiting area at periodic time intervals ($T_{n+1}$), and the GPS data comprises location area ($L_S$), a vehicle time of entry (VIN) into an area, a vehicle time of exit ($V_{OUT}$) from the area, and time-registered vehicle coordinates ($V_{XYT}$) within the area at periodic time intervals (VTn+1).

In a non-limiting preferred embodiment the camera may be configured with calibration programming instructions to receive infrared spectrum radiation of a passenger to capture passenger data and remove background noise, said passenger data converted to JSON format.

In another non-limiting preferred embodiment the camera may have calibration programming instructions capable of calibrating the camera to human skin temperature, said background noise such as thermal radiation selected from an empty security checkpoint and from non-passenger objects, said non-passenger objects selected from a travel bag or luggage, a wheelchair, a stroller, and a pet carrier.

In another non-limiting preferred embodiment the camera may be configured with privacy-screening programming instructions for applying a face blur to eliminate personally identifiable information from said passenger data.

FIG. 2 discloses MQTT broker 208 connected to Python Server 212, MongoDB 216, Nodejs Server 222, REACT QueueHub App 246, Scheduler 232, and Data Warehouse 248. The system uses a Socket.io module 234 for real-time data 236 between the Nodejs server 222 and the REACT App 246. A REST API module 238 connects the Nodejs Server 22 to Route protection module 224. Keycloak module 240 connects Route protect module 224 to the REACT App 246. A Basic Auth module 242 sends Route Protection 224 feed to the End-user 244 web, kiosk, mobile, channels. Scheduler 232 communicates data from the Nodejs Server 222 through Route Protect 224 to the Data warehouse 248 (MySQL) using modules for wait time historical 226, collection clean-up 228, and object, coordinates 230.

FIG. 2 discloses display module and devices 252, real-time analysis module and displays 254, mobile app 256, and analytical reports module and outputs 258 providing actionable intelligence for the end user from the system.

Figure 3:
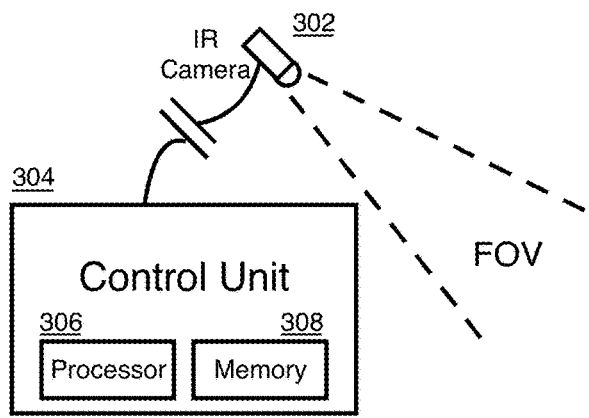
FIG. 3 is an illustration of a camera connected to a control unit having a processor and memory.

FIG. 3 is an illustration of a camera 302 connected to a control unit 304 having a processor 306 and memory 308. FIG. 3 shows the field of view (FOV) is an important parameter for capturing data within the boundary of the passenger waiting area.

Figure 4:
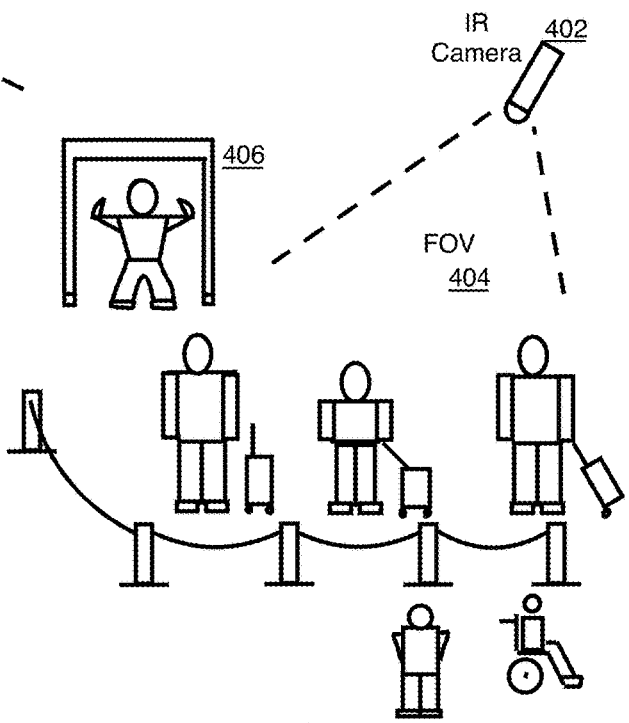
FIG. 4 is an illustration showing a passenger waiting area at a security checkpoint of an airport with a line of passengers in view of a camera.

FIG. 4 is an illustration showing a passenger waiting area at a security checkpoint 404 of an airport with a line of passengers in view of a camera 402. FIG. 4 shows both people and luggage and a wheelchair. The camera uses the emissivity difference between human skin and the non-human objects to identify only the human passengers for capture as passenger data, and not to incorrectly identify non-human objects as false positives. FIG. 4 also shows that the camera is calibrated to only pick up passenger data from within the waiting line area, and not to count humans standing outside the waiting line area boundary 406.

Figure 5:
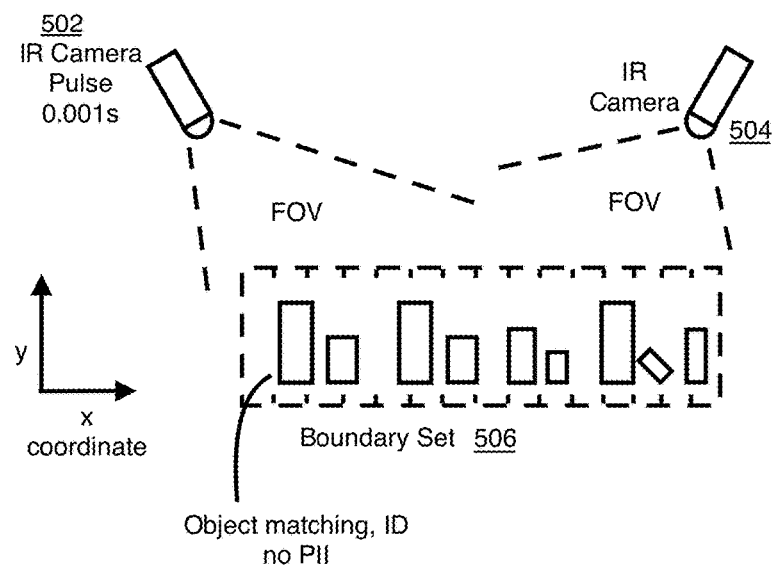
FIG. 5 is an illustration of a pair of cameras having a passenger waiting area indicated by a boundary at a security checkpoint.

FIG. 5 is an illustration of a pair of cameras 502, 504 having a passenger waiting area indicated by a boundary 506 at a security checkpoint. FIG. 5 shows that a passenger waiting area can be defined according to X and Y coordinates. FIG. 5 also shows that the camera is calibrated to remove personally identifiable information (PII) 508, by for example applying facial blur within the camera settings.

Figure 6:
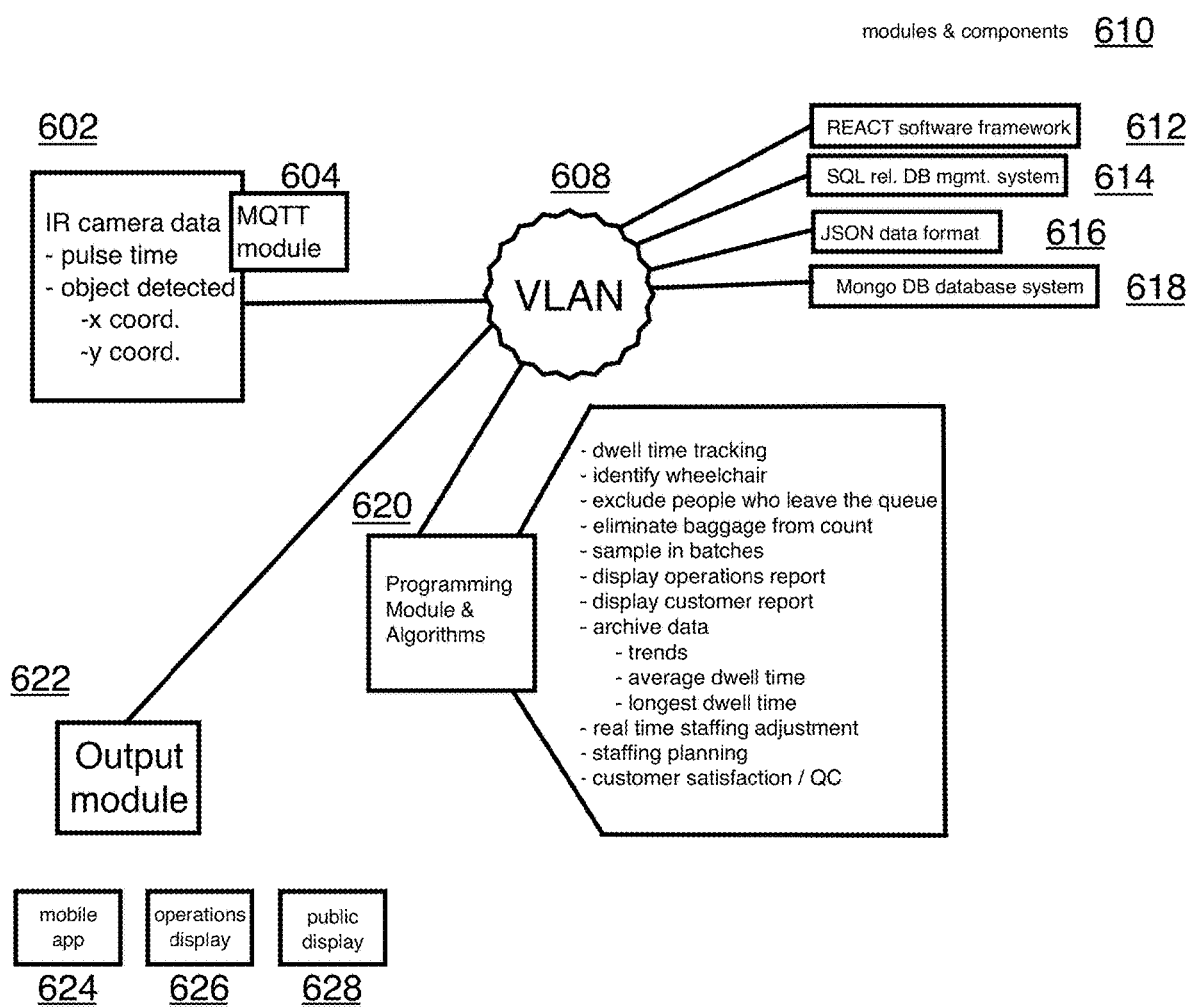
FIG. 6 is a schematic representation showing a camera having an mqtt module transmitting passenger data according to an mqtt protocol to a network server having and output module transmitting to a mobile app and operations display and a public display, a programming module having specified functions, and a list of modules and components within the network including a react router, SQL database Json messages and a Mongo database.

FIG. 6 is a schematic representation showing a camera 602 having an MQTT module 604 transmitting passenger data according to an MQTT protocol to a network server 608 having an output module 622 transmitting to a mobile app 624 and operations display 626 and a public display 628, a programming module 620 having specified functions, and a list of modules and components 610 within the network including a react router 612, SQL database 614, Json messages module 616 and a Mongo database 618.

Figure 7:
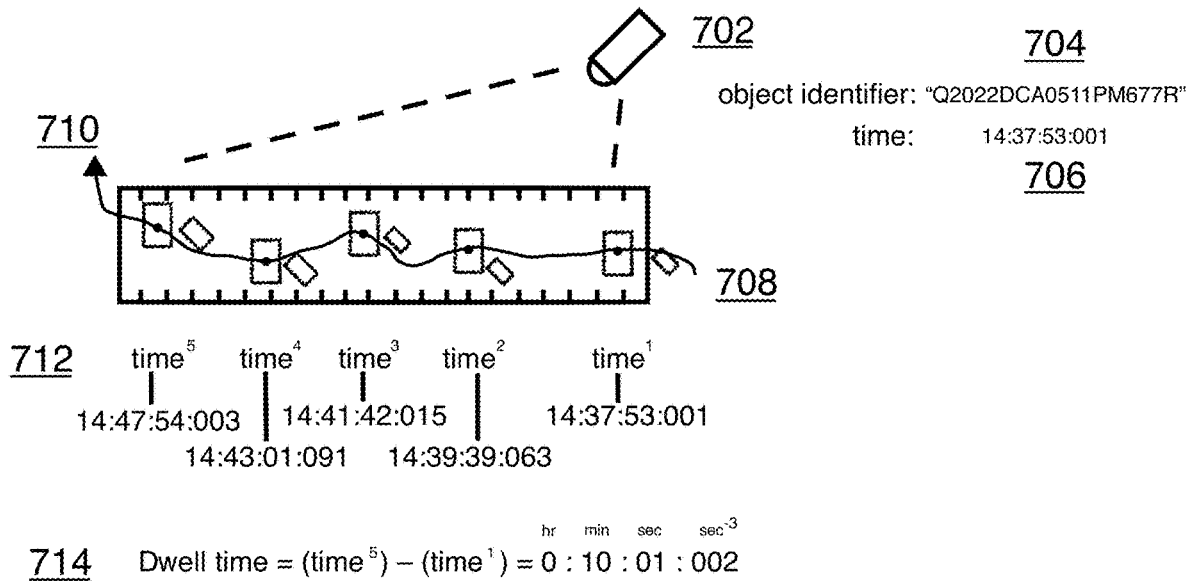
FIG. 7 is an illustration of a camera tracking an object from time of Entry into a passenger waiting area at a security checkpoint to time of exit from the passenger waiting area.

FIG. 7 is an illustration of a camera 702 tracking an object 704 from time of Entry 706 into a passenger waiting area at a security checkpoint 708 to time of exit 710, 712 from the passenger waiting area. FIG. 7 shows a time series progression 712 of the movement of the passenger through the passenger waiting area, and a Dwell time module 714 calculating dwell time within the waiting area 708.

Figure 8:
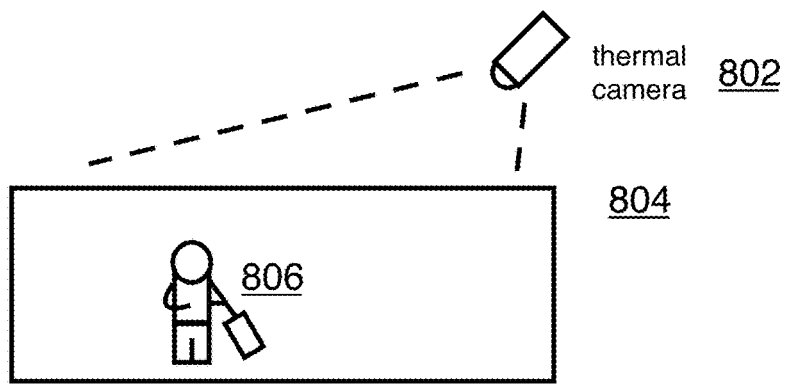
FIG. 8 is an illustration of a camera distinguishing between the emissivity of an empty passenger waiting area such as a granite floor from the emissivity of human skin and further distinguishing the emissivity of materials that make up luggage such as leather, painted aluminum, and plastic.

FIG. 8 is an illustration of a camera 802 distinguishing between the emissivity of an empty passenger waiting area 804 such as a granite floor from the target emissivity 806 of human skin and further distinguishing the emissivity of materials that make up luggage such as leather, painted aluminum, and plastic.

Figure 9:
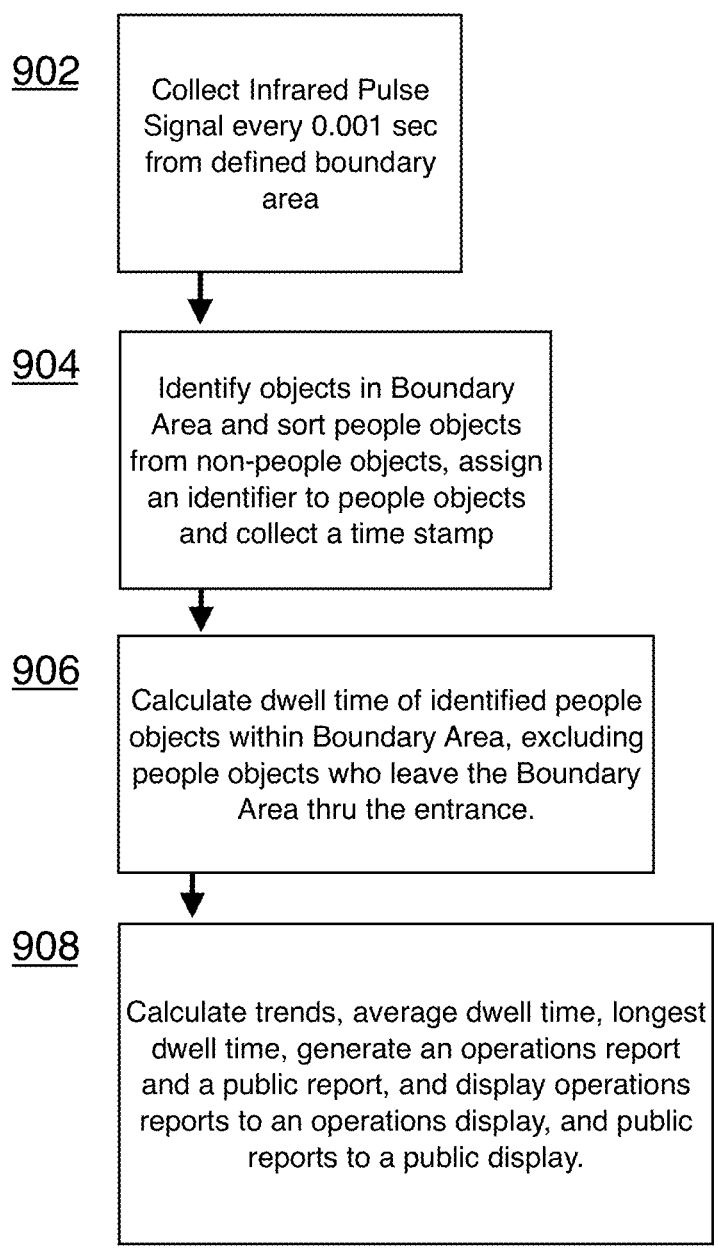
FIG. 9 is a schematic flowchart showing a sequence of steps including collecting an infrared pulse signal from a defined boundary area, identifying objects and sorting people from non people objects, calculating a dwell time within the boundary area, and generating analytical reports to be transmitted to various displays.

FIG. 9 is a schematic flowchart showing a sequence of steps including collecting an infrared pulse signal from a defined boundary area 902, identifying objects and sorting people from non people objects 904, calculating a dwell time within the boundary area 906, and generating analytical reports to be transmitted to various displays 908.

FIG. 10 is an illustration of a trained alignment database showing how a camera can distinguish people objects 1002 from non people objects 1004. 1006 in a passenger waiting line at a security checkpoint.

FIG. 11 is an illustration showing the infrared spectrum wavelengths that can be used in thermal and radiographic (IR) cameras.

GPS and Beacons

In another preferred, non-limiting embodiment, airport vehicles and mobile assets can be tracked using cameras as well as GPS transponders, WiFi beacon transmitters, and other airport-wide tracking devices. Vehicles using a sim card can collect and transmit latitude and longitude information that can be displayed over internal airport mapping displays.

The inventive system is configured to work with location and tracking middle-ware that is used by GPS transponders, WiFi beacon transmitters, and other airport-wide tracking devices. Preferably, the middleware is received into the system using WebSocket.

Figure 12:
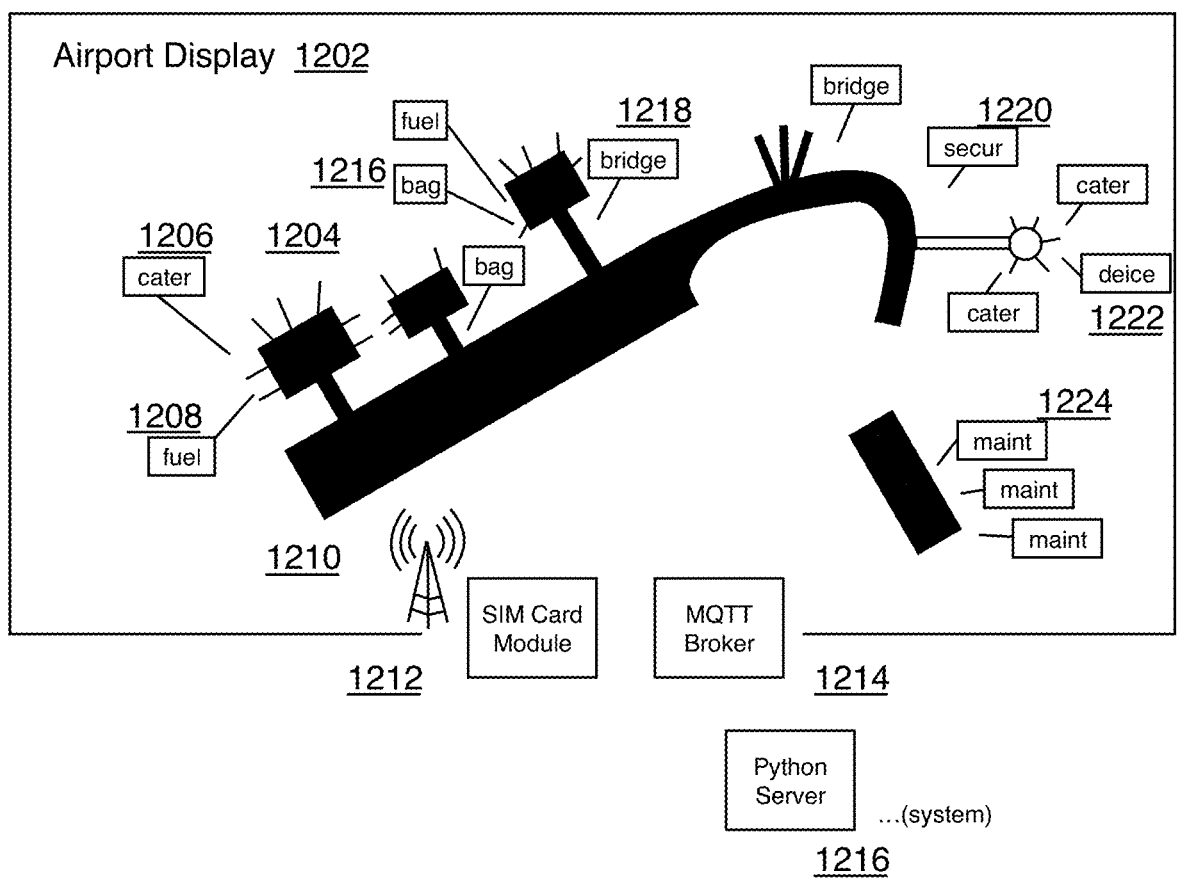
FIG. 12 is an illustration of an airport display showing that airport vehicles equipped with sim cards feed airport object (vehicle) data into the MQTT broker for handling according to the method and system of the invention.

FIG. 12 illustrates airport vehicle tracking. FIG. 12 shows an illustration of an airport display 1202 showing an aerial view of the airport with airport vehicles, cater 1206, fuel 1208, bag 1216, jet bridge 1218, security 1220, and maintenance 1224 equipped with sim cards 1212 feed airport object (vehicle) data into the MQTT broker 1214 for handling according to the method and system 1216 of the invention.

Wayfinding

Figure 13:
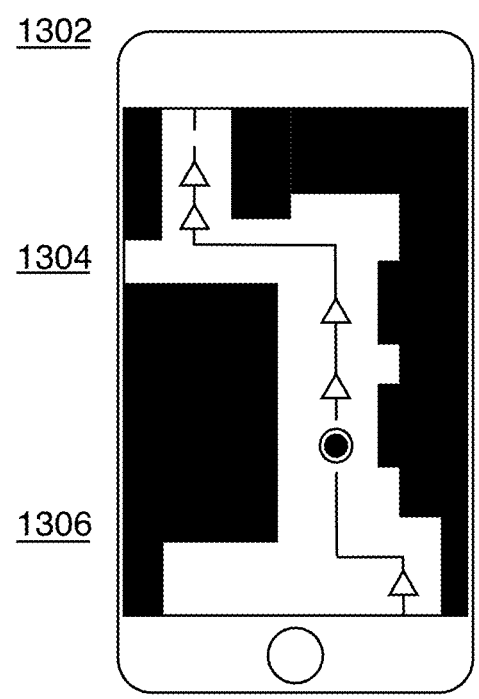
FIG. 13 is an illustration of a mobile device (phone) displaying a wayfinding screen using the sim card or beacon location as an overlay on the airport facility map, according to the method and system of the invention.

FIG. 13 illustrates that Wayfinding modules are contemplated as within the scope of the invention. Using an airport mobile app 1302, such as the DC airports mobile app, passengers and vehicles can be provided directions to airport location using a wayfinding arrow overlay 1304 that provides instructions to navigate the airport terminals or airport properties 1306. Wayfinding services are used to provide updated travel directions to passengers and vehicles where roads or paths are closed, are under renovation or repair.

Referring again to FIGS. 1 and 2, FIGS. 1 and 2 show the camera connected to an MQTT broker. The MQTT broker may be implemented on a Python server or may be implemented on a dedicated separate server.

MQTT

MQTT is a publish/subscribe messaging transport protocol. It has low complexity, small code footprint and consumes low network bandwidth for messaging. The lightweight protocol and small packet size support makes it suitable for applications such as Machine to Machine (M2M) and Internet of Things (IoT).

The protocol runs over network protocols like TCP/IP that provide ordered, lossless, bidirectional connections. MQTT-SN v1.2, MQTT for Sensor Networks (formerly known as MQTT-S), is a version of the protocol targeted for embedded devices on non-TCP/IP networks, such as Zigbee. Connectionless network transports such as User Datagram Protocol (UDP) are not suitable because packets may be lost or arrive out of order. The protocol enables transmit of messages either in 1-to-1 or 1-to-n configuration. The messaging transport is agnostic to the content of the payload.

MQTT used to mean MQ Telemetry Transport, where MQ is sometimes mistaken for Message Queue. In fact, MQ referred to IBM's MQ Series of products. Today, MQTT is not an acronym and it doesn't use traditional message queues.

MQTT Broker, Publisher, Subscriber

The essential component in MQTT is the broker, which orchestrates pub/sub (publish and subscribe) communication. The MQTT broker manages topics when a sensor (publisher) sends its message to a topic; then the broker sends messages back to any application (client) that subscribed to the topic. A client can be a user's smartphone or an application in the cloud.

Topics may be assigned for raw data (object (vehicle or passenger) data, time of entry to a waiting area, time of exit, time-series position of a object (vehicle or passenger) within the waiting area, etc.) and topics for processed data (analyzed Topics).

MQTT uses Publish/Subscribe communications. cameras, as publishers, publish messages. Subscribers can be any application or device that receives messages if they have subscribed to the same. However, publishers and subscribers do not communicate to each other directly, but only through the MQTT Broker that mediates the communications.

The MQTT Broker assigns "topics", or filters, to all incoming messages and distributes them to subscribers accordingly. Publishers and subscribers are also called Clients. Subscribers subscribe to messages that are of interest to them. Topics can be topic-based, content-based, or type-based. Topics are organized in a hierarchy.

With the publish/subscribe pattern, the publisher and subscribers don't need to know each other. They are not dependent on each other for initialization and synchronisation. Message delivery is one-to-many and can scale with respect to subscribers without burdening publishers.

MQTT does not function like message queues. Messages cannot get stuck in a queue if no one reads them. In message queues, only one consumer can read the message. Message queues are also defined explicitly but in MQTT topics can be created on the fly.

MQTT uses small code and memory footprint for constrained devices, and is network-bandwidth efficient transferring payloads without significant overhead (2-4 byte header size). An MQTT broker can inform subscribers that an IoT device (publisher) is not reachable by publishing the last best message. MQTT is payload data agnostic, and can include data that is binary, JSON or any other format. MQTT messages permit selection of a needs-based Quality-of-Service data delivery. MQTT sessions can be continued even across intermittent network connections, without requiring re-subscription when reconnecting to a server. MQTT brokers store the last published message (with retained flag set to true) so that new subscribers can immediately obtain last known good value rather than wait for the next update from a publisher.

MQTT Topics

MQTT topics are a form of addressing that allows MQTT clients to share information. MQTT Topics are structured in a hierarchy similar to folders and files in a file system using the forward slash (/) as a delimiter. A PUBLISH message in MQTT has several attributes.

Packet Identifier. The packet identifier uniquely identifies a message as it flows between the client and broker. The packet identifier is only relevant for QoS levels greater than zero. The client library and/or the broker is responsible for setting this internal MQTT identifier.

Topic Name. The topic name is a simple string that is hierarchically structured with forward slashes as delimiters. For example, "myhome/livingroom/temperature" or "Germany/Munich/Octoberfest/people". For details on topics, see part 5 of MQTT Essentials.

QoS. This number indicates the Quality of Service Level (QoS) of the message. There are three levels: 0, 1, and 2. The service level determines what kind of guarantee a message has for reaching the intended recipient (client or broker). For details on QoS, see part 6 of MQTT Essentials.

Retain Flag. This flag defines whether the message is saved by the broker as the last known good value for a specified topic. When a new client subscribes to a topic, they receive the last message that is retained on that topic. For details on retained messages, see part 8 of MQTT Essentials.

Payload. This is the actual content of the message. MQTT is data-agnostic. It is possible to send images, text in any encoding, encrypted data, and virtually every data in binary.

DUP flag. The flag indicates that the message is a duplicate and was resent because the intended recipient (client or broker) did not acknowledge the original message. This is only relevant for QoS greater than 0. Usually, the resend/duplicate mechanism is handled by the MQTT client library or the broker as an implementation detail.

When a client sends a message to an MQTT broker for publication, the broker reads the message, acknowledges the message (according to the QoS Level), and processes the message. Processing by the broker includes determining which clients have subscribed to the topic and sending the message to them. Once the broker receives the PUBLISH message, it is the responsibility of the broker to deliver the message to all subscribers. The publishing client does not get any feedback from the broker.

Subscribe

Publishing a message doesn't make sense if no one ever receives it. In other words, if there are no clients to subscribe to the topics of the messages. To receive messages on topics of interest, the client sends a SUBSCRIBE message to the MQTT broker. This subscribe message is very simple, it contains a unique packet identifier and a list of subscriptions.

Packet Identifier. The packet identifier uniquely identifies a message as it flows between the client and broker. The client library and/or the broker is responsible for setting this internal MQTT identifier.

List of Subscriptions. A SUBSCRIBE message can contain multiple subscriptions for a client. Each subscription is made up of a topic and a QoS level. The topic in the subscribe message can contain wildcards that make it possible to subscribe to a topic pattern rather than a specific topic. If there are overlapping subscriptions for one client, the broker delivers the message that has the highest QoS level for that topic.

MQTT brokers and clients can also use additional messages to manage the communication protocol, including: SUBACK (subscription acknowledgment), UNSUBSCRIBE, and UNSUBACK (unsubscribe acknowledgement).

In the present invention, FIGS. 1 and 2 show an online MQTT Broker of an MQTT Python Server in communication with the MQTT client publisher module of the camera configured for receiving object (vehicle or passenger) data. The MQTT Broker establishes MQTT Topics associated with the object (vehicle or passenger) data. The MQTT Topics comprise a Security Checkpoint ($A_S$) Topic, a Security Checkpoint Analyzed ($A_{S-A}$) Topic, a object (vehicle or passenger) time of entry ($T_{IN}$) Topic, a object (vehicle or passenger) time of entry Analyzed ($T_{IN-A}$) Topic, a object (vehicle or passenger) time of exit ($T_{OUT}$) Topic, a object (vehicle or passenger) time of exit Analyzed ($T_{OUT}$-A) Topic, a time-registered object (vehicle or passenger) coordinates ($P_{XYT}$) Topic, a time-registered object (vehicle or passenger) coordinates Analyzed ($P_{XYT-A}$) Topic, and a object (vehicle or passenger) wait time ($T_{OUT}$-$T_{IN}$) Topic.

Python Server

FIGS. 1 and 2 also illustrate a Python Server in communication with the MQTT Broker. The MQTT Python Server configured with programming instructions to publish, subscribe, unsubscribe, and process the object (vehicle or passenger) data. The MQTT Python Server has a library of scripts for publishing, subscribing, unsubscribing, and processing the MQTT messages.

Python is a computer programming language often used to build websites and software, automate tasks, and conduct data analysis. Python used with MQTT provides a library of scripts or programs used to process and manage the communication messages between the MQTT publisher(s), the airport object (vehicle or passenger) waiting area(s) camera(s), and the subscriber clients, including the Mongo DB storage database, the Node Server, and so forth. MQTT Python also provides scripts for performing the analysis of each Topic within the object (vehicle or passenger) data.

Generally, an MQTT Python script will listen to the object (vehicle or passenger) data, process the data and publish a message to "data analyzed" whenever it's relevant. For example, the MQTT Broker establishes MQTT Topics associated with the object (vehicle or passenger) data. The MQTT Topics include a Security Checkpoint ($A_S$) Topic, a Security Checkpoint Analyzed ($A_{S-A}$) Topic, a object (vehicle or passenger) time of entry ($T_{IN}$) Topic, a object (vehicle or passenger) time of entry Analyzed ($T_{IN-A}$) Topic, a object (vehicle or passenger) time of exit ($T_{OUT}$) Topic, a object (vehicle or passenger) time of exit Analyzed ($T_{OUT-A}$) Topic, a time-registered object (vehicle or passenger) coordinates ($P_{XYT}$) Topic, a time-registered object (vehicle or passenger) coordinates Analyzed ($P_{XYT-A}$) Topic, and a object (vehicle or passenger) wait time ($T_{OUT}$-$T_{IN}$) Topic. The MQTT Python Server is configured with programming instructions to publish, subscribe, unsubscribe, and process the object (vehicle or passenger) data, and the MQTT Python Server has a library of scripts for publishing, subscribing, unsubscribing, and processing the MQTT messages between the publisher(s) and the client(s).

Mongo DB

FIGS. 1 and 2 illustrate that the Python Server is in communication with a Mongo DB Server. The storage database, Mongo DB, is a database server, and preferably a database server configured to manage time-series data. The storage database/server includes a backend application to receive the object (vehicle or passenger) data (or object (vehicle or passenger) coordinates data) and store the data to provide access to the MQTT Topics that are relevant to the end user subscriber-client. The MQTT Topics include the raw data single-point measurements from the camera(s), and the analyzed data used for constructing real-time graphs and reports that are displayed in a real-time queue display, a real-time operations analysis for, e.g. staffing and volume, a public facing mobile App as well as an operations access-only mobile App, and historical analytical reports for maintenance and resource management purposes.

In the present invention, FIGS. 1 and 2 show the storage database server (Mongo DB) in communication with the MQTT Python Server. The storage database server is configured with application programming code to receive the object (vehicle or passenger) data (or object (vehicle or passenger) coordinates data), to store the object (vehicle or passenger) data, to provide subscriber-client access to the MQTT Topics, to manage time-series data, and to process the object (vehicle or passenger) data to generate a calculated wait time data ($T_{OUT}$-$T_{IN}$) for each object (vehicle or passenger), and a time-registered object (vehicle or passenger) coordinates data ($P_{XYT-A}$) for analyzing object (vehicle or passenger) wait time between each x-y coordinate of a object (vehicle or passenger) through the security checkpoint waiting area.

NODE.js Server

FIGS. 1 and 2 illustrate the Node.js Server in communication with the Mongo DB Server. The Node.js Server makes the system and method application(s) available to serve HTTP requests. It provides the interaction between users and your application. Using a built-in http module of the Node.js server, the system and method creates an instance of an HTTP server that can handle requests, issue responses, save assets and files, play media, create directories, and so forth. The Node.js server continues running even after the operating system is rebooted, by restarting the App after a crash. This makes Node.js server useful for monitoring and restarting Node servers.

The Node.js server herein uses the object (vehicle or passenger) data to generate at least specific reports, namely a Wait time historical report, a Collection clean up report, and a object (vehicle or passenger) coordinates report. The Node.js server is in communication with a Scheduler module, wherein the Scheduler receives the three reports, the Wait time historical report, the Collection clean up report, and the object (vehicle or passenger) coordinates report.

FIGS. 1 and 2 show a Node.js Server in communication with the MQTT Broker configured for subscribing to the MQTT Topics of the object (vehicle or passenger) data. The Node.js Server is also configured with application programming code to provide subscriber-client access to the MQTT Topics associated with the object (vehicle or passenger) data, to transmit, store, and manage the object (vehicle or passenger) data (or object (vehicle or passenger) coordinates data), the calculated wait time data ($T_{OUT}-T_{IN}$) for each object (vehicle or passenger), and the time-registered object (vehicle or passenger) coordinates data ($P_{XYT-A}$) for analyzing object (vehicle or passenger) wait time between each x-y coordinate of a object (vehicle or passenger) through the security checkpoint waiting area.

FIGS. 1 and 2 also show the Node.js Server is configured with application programming code to use the object (vehicle or passenger) data to generate at least three specific reports comprising a Wait time historical report, a Collection clean up report, and a object (vehicle or passenger) coordinates report, wherein the Node.js server is in communication with a Scheduler module, wherein the Scheduler receives the at least three specific reports from the Node.js Server.

FIGS. 1 and 2 also show the Node.js Server is configured with application programming code to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

Rest API 204. FIGS. 1 and 2 then show a REST API module operatively connected to the Node.js Server. A standard API, or application programming interface, is a set of rules that define how applications or devices can connect to and communicate with each other. A REST API is an API that conforms to the design principles of the REST, or representational (RE) state(S) transfer (T) architectural style for distributed media systems.

In a REST API, data and functionality are considered resources and are accessed using Uniform Resource Identifiers (URIs). Any named information can be a resource. Resources herein can be the object (vehicle or passenger) data, the MQTT Topics, the analytical data, and so forth. The resources are acted upon by using a set of simple, well-defined operations. The resources are decoupled from their representation so that clients can access the content in various formats, such as HTML, XML, plain text, PDF, JPEG, JSON, and others. Clients and servers exchange representations of resources by using a standardized interface and protocol. Typically HTTP is the most used protocol, but REST does not mandate it. Metadata about the resource is made available and used to control caching, detect transmission errors, negotiate the appropriate representation format, and perform authentication or access control. Every interaction with the server must be stateless. Using these principles help RESTful applications to be simple, lightweight, and fast.

FIGS. 1 and 2 show a REST API module (representational (RE) state(S) transfer (T), Application Programming Interface) in communication with the Node.js Server. The REST API module is configured with application programming code for receiving the object (vehicle or passenger) data, and to provide a set of rules to define how applications, clients, and servers connect to and communicate with each other. The REST API is configured with application programming code to use Uniform Resource Identifiers (URIs) to provide access to resources comprising the object (vehicle or passenger) data, the MQTT Topics, and the analytical data, decoupled from representation, to provide access by a client in various formats comprising HTML, XML, plain text, PDF, JPEG, and JSON. The REST API also exchanges representations of resources between a client and the Node.js Server by using a standardized interface and protocol, and uses metadata about a resource to control caching, detect transmission errors, negotiate an appropriate representation format, and perform authentication or access control.

SOCKET.IO

Socket.IO is a library that enables low-latency, bidirectional and event-based communication between a client and a server. It is built on top of the WebSocket protocol and provides additional guarantees like fallback to HTTP long-polling or automatic reconnection. WebSocket is a communication protocol which provides a full-duplex and low-latency channel between the server and the browser. As used herein, JavaScript (Node.js) is the server implementations for Socket.IO.

FIGS. 1 and 2 show a Socket.IO module in communication with the Node.js Server. The Socket.IO module is configured with application programming code for receiving the object (vehicle or passenger) data, and to provide a library that enables low-latency, bidirectional and event-based communication between a REACT router client and the Node.js Server. The Socket.IO is built on top of the WebSocket communication protocol and provides one or more additional guarantees like fallback to HTTP long-polling and automatic reconnection. The WebSocket module implements the WebSocket communication protocol to provide a full-duplex and low-latency channel between the Node.js Server and a client browser.

Route Protection—Keycloak

Route protection—Keycloak is a single authentication sign-on solution for web apps and RESTful web services. Route protection secures the apps and services deployed in the invention. Route protection provides customizable user interfaces for login, registration, administration, and account management. Route protection can also delegate authentication to third party identity providers like Facebook and Google.

Route protection, as implemented with Keycloak comprises the following components: Single-Sign On and Single-Sign Out for browser applications; OpenID Connect support; OAuth 2.0 support; SAML support; Identity Brokering-Authenticate with external OpenID Connect or SAML Identity Providers; Social Login-Enable login with Google, GitHub, Facebook, Twitter, and other social networks; User Federation; Server bridge-Automatically authenticate users that are logged-in to a server; Admin Console for central management of users, roles, role mappings, clients and configuration; Account Management console that allows users to centrally manage their account; Theme support-Customize all user facing pages to integrate with your applications and branding; Two-factor Authentication-Support for TOTP/HOTP via Google Authenticator or FreeOTP; Login flows-optional user self-registration, recover password, verify email, require password update, etc.; Session management-Admins and users themselves can view and manage user sessions; Token mappers-Map user attributes, roles, etc. how you want into tokens and statements; Not-before revocation policies per realm, application and user; CORS support—Client adapters have built-in support for CORS; Service Provider Interfaces (SPI)—A number of SPIs to enable customizing various aspects of the server; Authentication flows, user federation providers, protocol mappers; Client adapters for JavaScript applications, WildFly, JBoss EAP, Tomcat, Jetty, Spring, etc.; and Support for any platform/language that has an OpenID Connect Relying Party library or SAML 2.0 Service Provider library.

Route protection is implemented herein as a separate authentication server that is managed on the network. Applications are configured to point to and be secured by this server. Route protection uses open protocol standards like OpenID Connect or SAML 2.0 to secure application communications. Browser applications redirect a user's browser from the application to the authentication server where they enter their credentials. This redirection is important because users are completely isolated from applications and applications never see a user's credentials. Applications instead are given an identity token or assertion that is cryptographically signed. These tokens can have identity information like username, address, email, and other profile data. They can also hold permission data so that applications can make authorization decisions. These tokens can also be used to make secure invocations on REST-based services.

As used herein, the object (vehicle or passenger) data is received at the Route protection-authentication Server in communication with the Node.js Server. The Route protection Authentication Server is configured with application programming code to provide a single sign-on security solution for web access and REST API web services to protect application communications on multiple platforms and multiple technology stacks using OpenID Connect and SAML protocols to protect communication routes from users who don't have the proper authentication. Protected routes let us choose which routes users can visit based on whether they are logged in. For example, public routes where anyone can access, like a landing page, and a login page. Protected routes should only be available to authenticated users that are logged in, like a dashboard or settings page.

The React Router doesn't provide any functionality for route protection out of the box, because it was built for composability.

React

A React Router is a routing library for React. The React Router enables the navigation among views of various components in a React Application, allows changing the browser URL, and keeps the UI in sync with the URL. The React Router has an API with built-in features like lazy code loading, dynamic route matching, and location transition handling. The React router implements a component-based approach to routing. It provides different routing components according to the needs of the application and platform-dynamic routing. For example, a client browser sends a request to the REACT server. The server sends the request to a controller. The controller dispatches the route to the right Model. The Model fetches the data from a database server. A view module creates a response with the found data. The response is sent by the controller to the server. And the response is sent from the server to the client browser. However, unlike older static routing architectures where every request is required to be fully loaded to the client browser, any future requests using a REACT Router are just for data only.

FIGS. 1 and 2 show a React Router client in communication with the Socket.IO module. The React Router client is configured with application programming code for receiving the object (vehicle or passenger) data, and to provide a routing library for a React Server, to enable navigation among views of various components in a React Application, to allow changing the browser URL, and to keep a user interface (UI) in sync with an associated URL. The React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only.

Scheduler

A job scheduler allows us to run a job or a task at regular intervals or at a specified time. In the case of a Node.JS Scheduler, it triggers a JavaScript function at our specified time or interval. In the present invention, the JS function is to generate analytical reports of the object (vehicle or passenger) data.

In the present invention, the Scheduler module may include, in a preferred embodiment, support for scheduling a job at a specified date and times, support for recurrent jobs, support for persistence, support for horizontal scaling of job multiple processors across multiple hosts, and/or support for locking jobs and prevention of duplicate job execution.

FIGS. 1 and 2 show a Scheduler module in communication with the Node.js Server. The Scheduler module is configured with application programming code for receiving object (vehicle or passenger) data and to trigger a JavaScript function at our specified time or interval to run a job or a task at regular intervals or at a specified time. One of said JS functions is to generate historical analytical reports of the object (vehicle or passenger) data. The Scheduler module providing support for scheduling a job at a specified date and times, support for recurrent jobs, support for persistence, support for horizontal scaling of job multiple processors across multiple hosts, and/or support for locking jobs and prevention of duplicate job execution.

Data Warehouse—My SQL

A data warehouse used herein is a data management system designed to enable and support analytics. The data warehouse is solely intended to perform queries and analysis and contains large amounts of historical object (vehicle or passenger) data.

FIGS. 1 and 2 show a Data Warehouse (My SQL) in communication with the Scheduler module. The Data Warehouse is configured with application programming code for receiving object (vehicle or passenger) data and to provide a data management system to enable and support analytics and to perform queries and analysis of large amounts of historical object (vehicle or passenger) data. The Data Warehouse is also configured with application programming code to also provide analytical reports associated with MQTT Topics.

Examples of analytical reports include reports associated with MQTT Topics. These would include reports on usage of a particular Security Checkpoint ($A_S$), and Security Checkpoint Analyzed ($A_{S-A}$). Other reports may include a object (vehicle or passenger) time of entry ($T_{IN}$), object (vehicle or passenger) time of entry Analyzed ($T_{IN-A}$), object (vehicle or passenger) time of exit ($T_{OUT}$), and object (vehicle or passenger) time of exit Analyzed ($T_{OUT}$). Other preferred reports may include time-registered object (vehicle or passenger) coordinates ($P_{XYT}$), time-registered object (vehicle or passenger) coordinates Analyzed ($P_{XYT-A}$) for analyzing object (vehicle or passenger) wait time between each x-y coordinate of a object (vehicle or passenger) through the security checkpoint waiting area, and object (vehicle or passenger) wait times ($T_{OUT}-T_{IN}$) within the security checkpoint boundary area.

Display

FIGS. 1 and 2 illustrate output of object (vehicle or passenger) data and analytics to multiple display screens in communication with the React Router. The multiple display screens and the React Router are configured with application programming code for receiving object (vehicle or passenger) data and to transmit object (vehicle or passenger) data to the multiple display screens, the multiple display screens comprising a real-time queue display screen, a real-time operations analysis display screen, a real-time mobile app display screen, and an analytical report display screen. The real-time queue display screen is a view from above the security checkpoint and shows a representation of object (vehicle or passenger) s entering the object (vehicle or passenger) waiting area, moving through the object (vehicle or passenger) waiting line, and exiting the object (vehicle or passenger) waiting line.

FIGS. 1 and 2, and FIG. 12 illustrate that the invention may also include a display module configured with programming instructions to provide a passenger dashboard and an airport operator dashboard. The passenger dashboard comprising display for reporting waiting area dwell times, estimated time of arrival walking to a selected destination, wayfinding directions, airport notifications, airline notifications, airport vendor notifications, baggage information, transportation information, wheelchair and gate shuttle access, and emergency notifications. The airport operator dashboard comprising display for providing admin access to manage the system, reporting passenger waiting area dwell times, reporting vehicle locations and dwell times, reporting system status, sending airport internal messages, sending airport notifications, receiving airline notifications, receiving airport vendor notifications, receiving baggage information, receiving transportation information, sending and receiving wheelchair and gate shuttle access and requests, and sending and receiving emergency notifications.

External Data Sources

Figure 14:
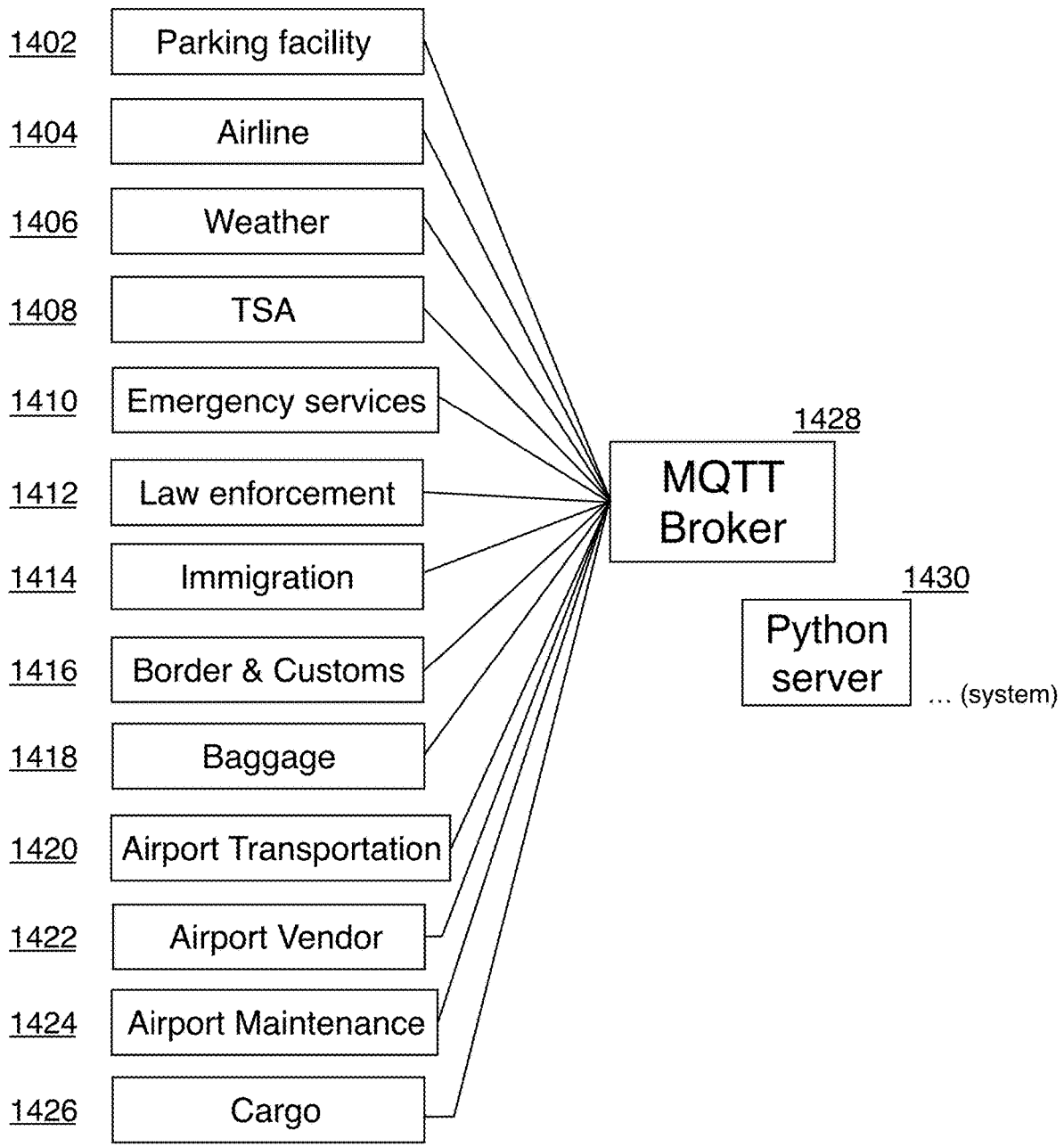
FIG. 14 is a schematic illustration showing that external data sources can be fed into the MQTT broker to supplement the reports produced according to the method and system of the invention.

FIG. 14 illustrates that the invention also contemplates integrating an external data module for receiving external data. External data can include parking vendor data 1402, airline data 1404, weather data 1406, TSA data 1408, emergency services data 1410, law enforcement data 1412, immigration data 1414, border and customs information 1416, baggage data 1418, airport transportation data 1420, airport vendor data 1422, airport maintenance data 1424, and airport cargo data 1426. Data feeds are sent thru MQTT Broker 1428 to for processing using the system 1430.

Combined Method and System

Figure 15:
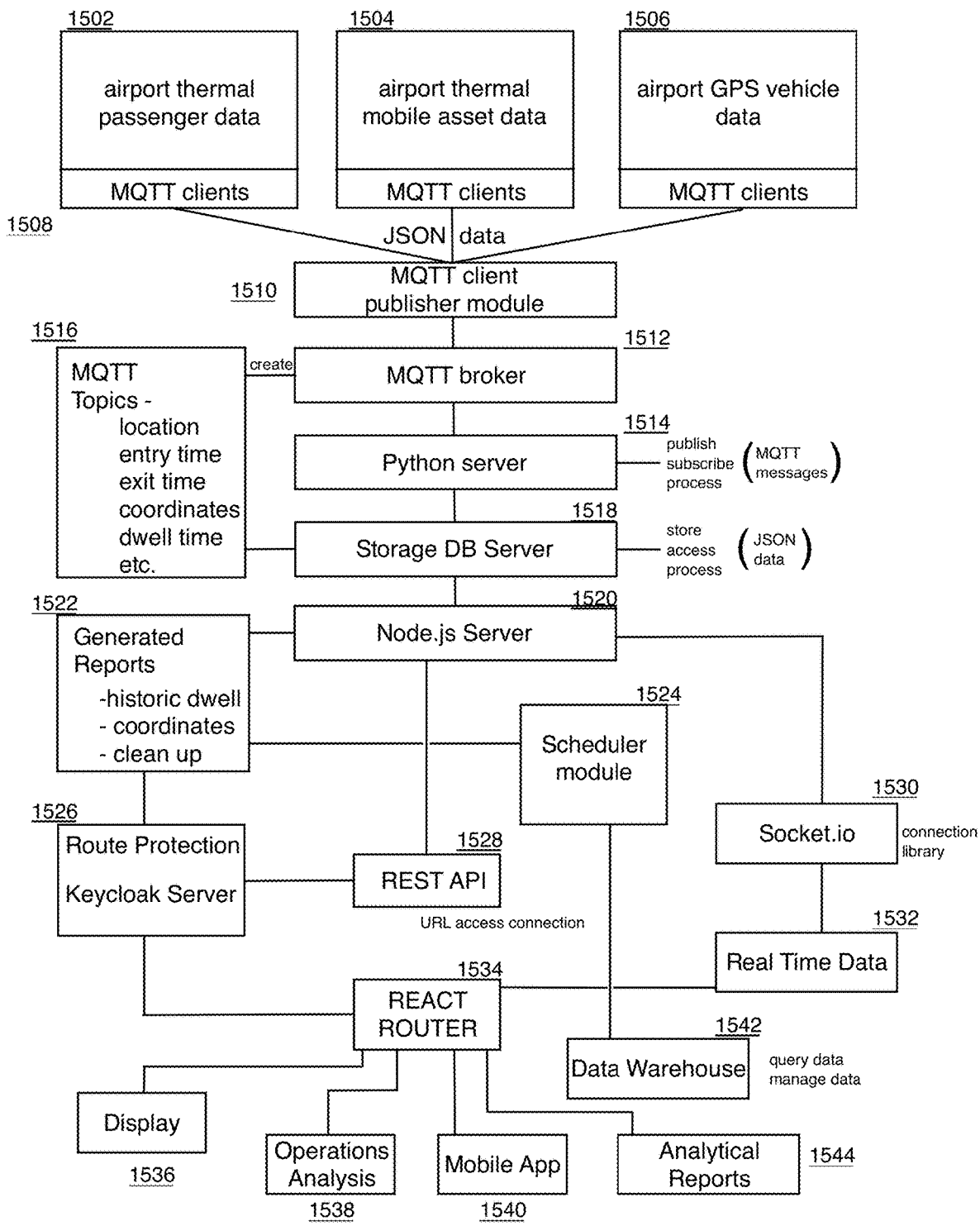
FIG. 15 is a schematic illustration of the combined system of receiving data of passengers and airport vehicles (camera MQTT clients), along with airport GPS or beacon vehicle data (GPS or beacon MQTT clients), converting the data to JSON format using an MQTT client publisher module of an MQTT broker that is part of a Python server. The MQTT broker establishes the MQTT topics assigned to the received data, and the Python server handles publishing, subscribing, and processing the MQTT messages. The storage DB handles storage, access and processing of the JSON data according to the MQTT topics. The Node.js Server generates reports and is in communication with REST API which provides URI access and connection. The Scheduler module sends the reports to the data warehouse, which manages the data and handles data queries. The Socket.io module provides a connection library for connected devices. The Route Protection Keycloak server provides secure connections, and the REACT router delivers the data to displays, an operations analysis module, mobile device apps, and to generate analytical reports, according to the method and system of the invention.

FIG. 15 illustrates the combined system of receiving data of passengers 1502 and airport vehicles 1504 (camera MQTT clients), along with airport GPS or beacon vehicle data 1506 (GPS or beacon MQTT clients), converting the data to JSON format 1508 using an MQTT client publisher module 1510 of an MQTT broker 1512 that is part of a Python server 1514. The MQTT broker 1512 establishes the MQTT topics 1516 assigned to the received data, and the Python server 1514 handles publishing, subscribing, and processing the MQTT messages. The storage DB 1518 handles storage, access and processing of the JSON data 1508 according to the MQTT topics 1516. The Node.js Server 1520 generates reports 1522 and is in communication with REST API 1528 which provides URI access and connection. The Scheduler module 1524 sends the reports to the data warehouse 1542, which manages the data and handles data queries. The Socket.io module 1530 provides a connection library for connected devices and uses Real time data module 1532 to connect to a REACT router 1534. The Route Protection Keycloak server 1526 provides secure connections for the generated reports 1522, the REST API 1528, and the REACT router 1534. The REACT router (and associated Mobile App) 1534 delivers the data to one or more display(s) 1536, to an operations analysis module 1538, and to a users mobile device app 1540. The REACT router 1534 also works with an analytical reports module 1544 to generate analytical reports.

Figure 16:
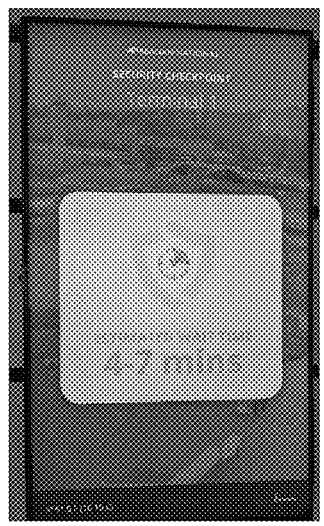
FIG. 16 is a photograph of an airport display showing an example of publishing a 4-7 minute estimated wait time at a security checkpoint in an airport terminal, according to the method and system of the invention.

FIG. 16 is a photograph of an airport display 1602 showing an example of publishing a 4-7 minute estimated wait time 1606 at a security checkpoint in an airport terminal 1604, according to the method and system of the invention.

Figure 17:
FIG. 17 is an illustration of a mobile app display showing an example of publishing a more than 20 minute security wait time at an airport terminal, according to the method and system of the invention.

FIG. 17 is an illustration of a mobile app display 1702 showing an example of publishing a more than 20 minute security wait time 1704 at an airport terminal 1708, according to the method and system of the invention. Flight data 1710, 1712, 1714 and weather data 1716 are also displayed.

FIG. 18 is a screenshot showing images from a series of cameras 1802, 1804, 1806 at an overflow parking lot and from display screens 1808, 1810. The images show how cameras with advanced recognition functions and programming can tally the number of available parking spaces, the number and type of cars entering and exiting the parking facility, and can provide analytical reports on activity and availability over specified time periods, as well the number of cars, buses, trucks, and vans, according to the method and system of the invention.

FIG. 19 is a screenshot showing images from a series of cameras at an airport checkpoint and from display screens 1902, 1904, 1906, 1908, 1910. The images show how cameras with advanced recognition functions and programming can identify passengers in a security queue and can calculate and publish wait times in specified periods, including daily and hourly, and can track and report average wait times and track and report the longest wait time, according to the method and system of the invention.

Figure 20:
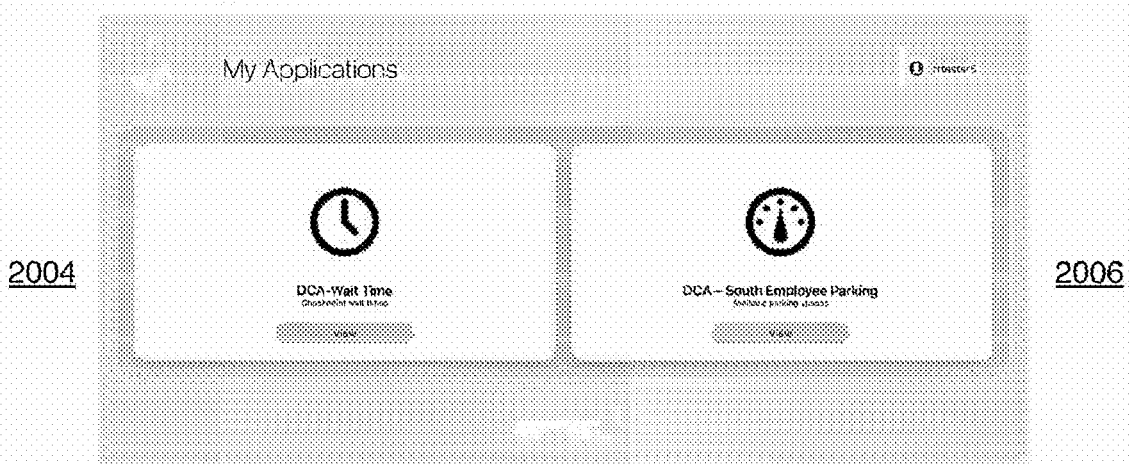
FIG. 20 is a screenshot from a display, mobile or desktop, showing a menu selection from security checkpoint wait times or parking facility utilization details, according to the method and system of the invention.

FIG. 20 is a screenshot 2002 from a display, mobile or desktop, showing a menu selection 2004, 2006 from security checkpoint wait times or parking facility utilization details, according to the method and system of the invention.

Figure 21:
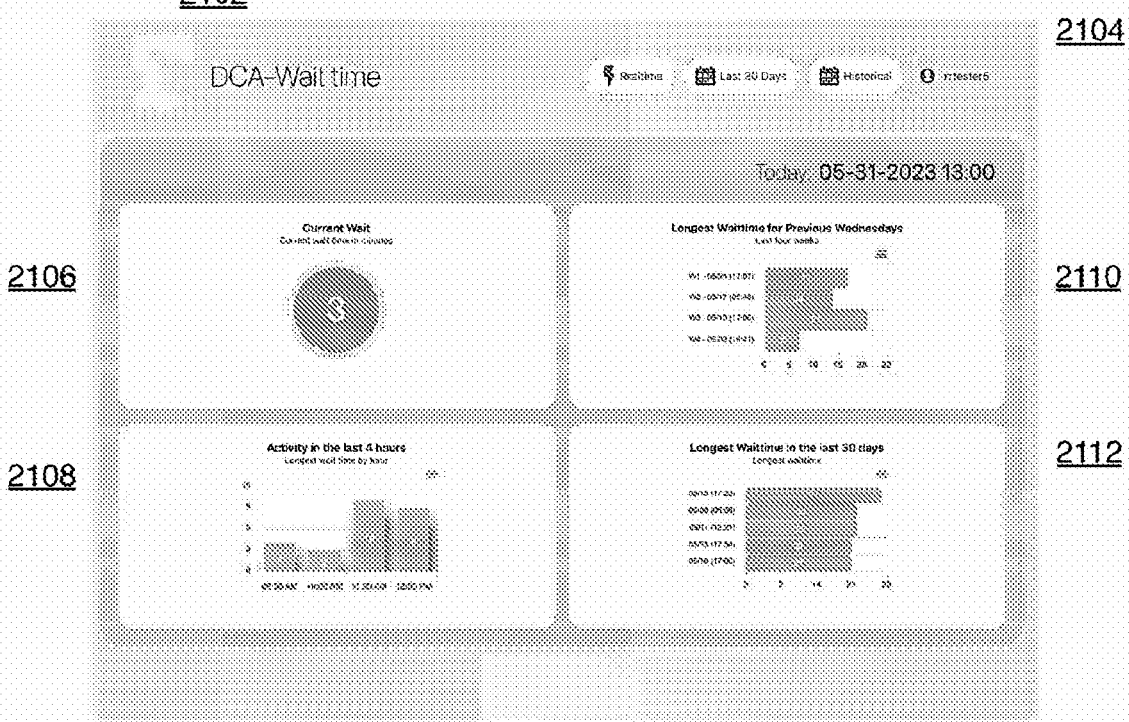
FIG. 21 is a screenshot from a mobile or desktop display showing security checkpoint dwell times and statistics on a specific day, according to the method and system of the invention.

FIG. 21 is a screenshot 2102 from a mobile or desktop display showing security checkpoint dwell times and statistics on a specific day 2104, 2106, 2108, 2110, 2112, according to the method and system of the invention.

Figure 22:
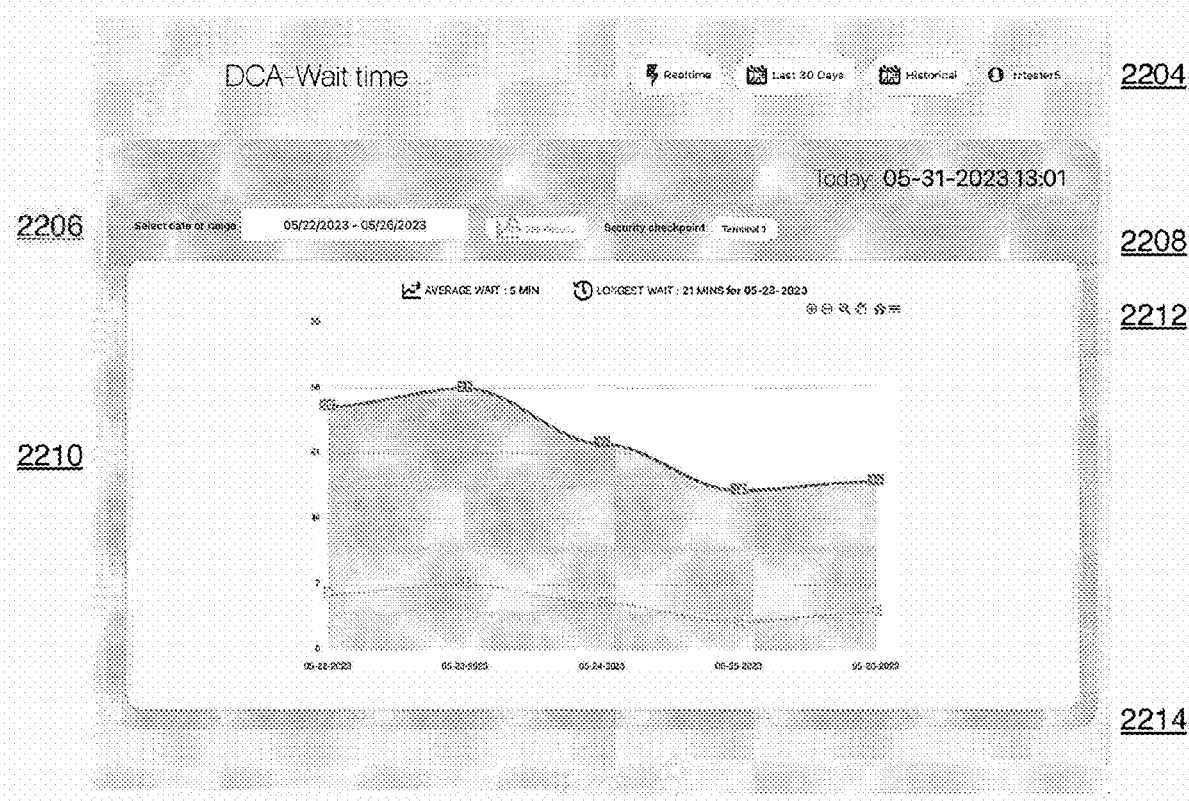
FIG. 22 is a screenshot from a mobile or desktop display showing security checkpoint dwell times and statistics over a selected period, according to the method and system of the invention.

FIG. 22 is a screenshot 2202 from a mobile or desktop display showing security checkpoint dwell times and statistics over a selected period 2204, 2206, 2208, 2210, 2212, 2214 according to the method and system of the invention.

Figure 23:
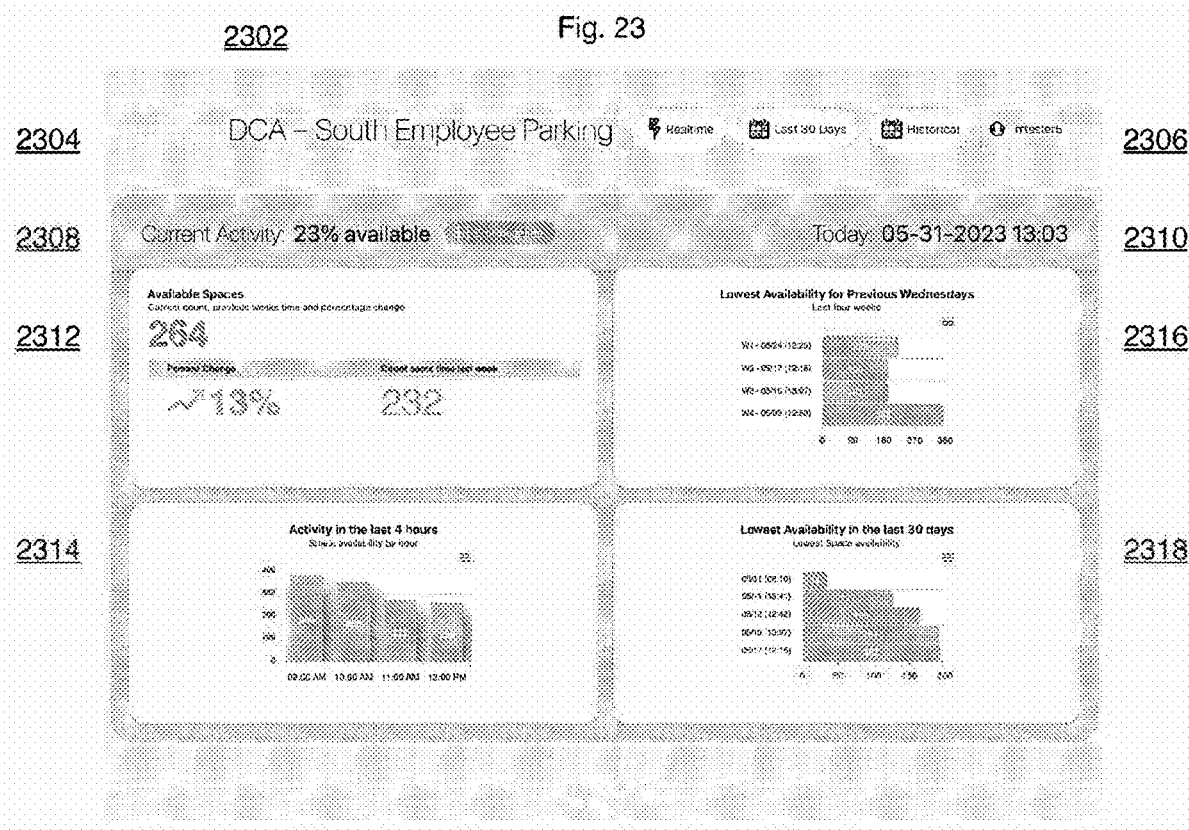
FIG. 23 is a screenshot from a mobile or desktop display showing parking facility space availability and statistics on a specific day, according to the method and system of the invention.

FIG. 23 is a screenshot 2302 from a mobile or desktop display showing parking facility space availability and statistics on a specific day 2304, 2306, 2308, 2310, 2312, 2314, 2316, 2318, according to the method and system of the invention.

Figure 24:
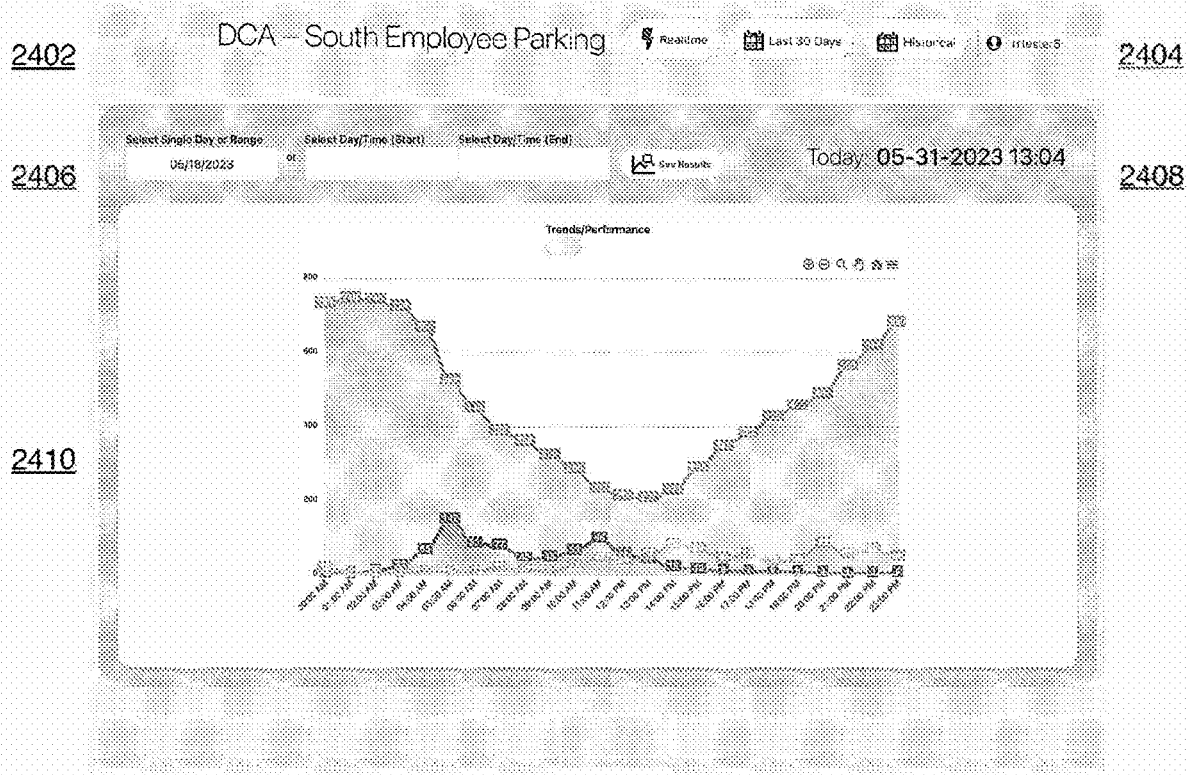
FIG. 24 is a screenshot from a mobile or desktop display showing parking facility space availability and statistics over a selected period, according to the method and system of the invention.

FIG. 24 is a screenshot 2402 from a mobile or desktop display showing parking facility space availability and statistics over a selected period 2404, 2406, 2408, 2410, according to the method and system of the invention.

Figure 25:
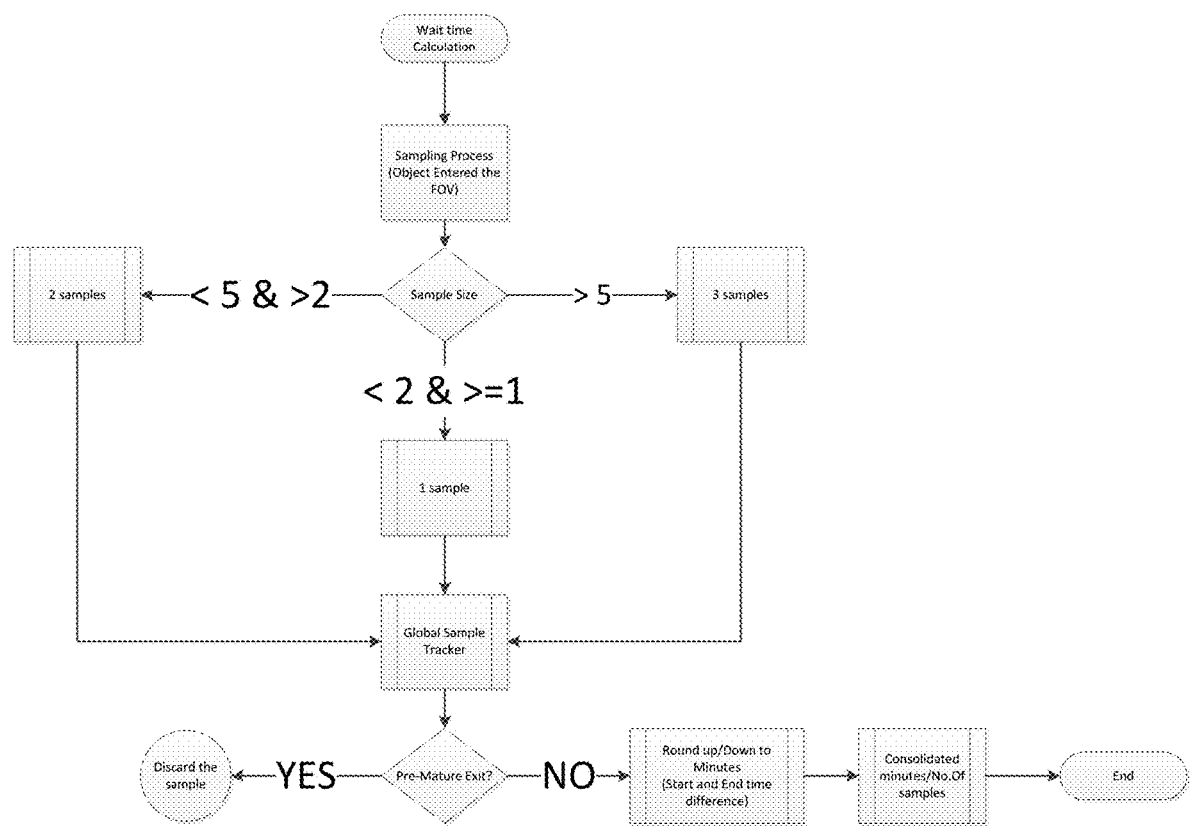
FIG. 25 is a flowchart illustration showing QueueHub wait-time calculation process flow.

FIG. 25 is a flowchart illustration showing QueueHub wait-time calculation process flow. The process shows a calculated wait time beginning with an airport object entering a FOV or other detected area such as on the external airport tarmac and gate area or within the airport interior terminal such as ticketing, security, lounges, shopping and food, parking, passenger gate, and so forth. A sample of objects is obtained and a determination is made regarding a cut-off number, e.g. 5 or 2, or 1, or greater than 1. The cut-off value is fed into a global sample tracker module. The process determines if the airport object has prematurely exiting the target area, and if so, the value is discarded. If the airport object remained in the target area, the start time and end time (dwell time) are obtained and a difference between the start time and end time is calculated. The calculated difference is then rounded up or down to a whole integer number. The process then calculates the consolidated minutes per the number of samples of airport objects, and outputs the value for reporting or display.

Figure 26:
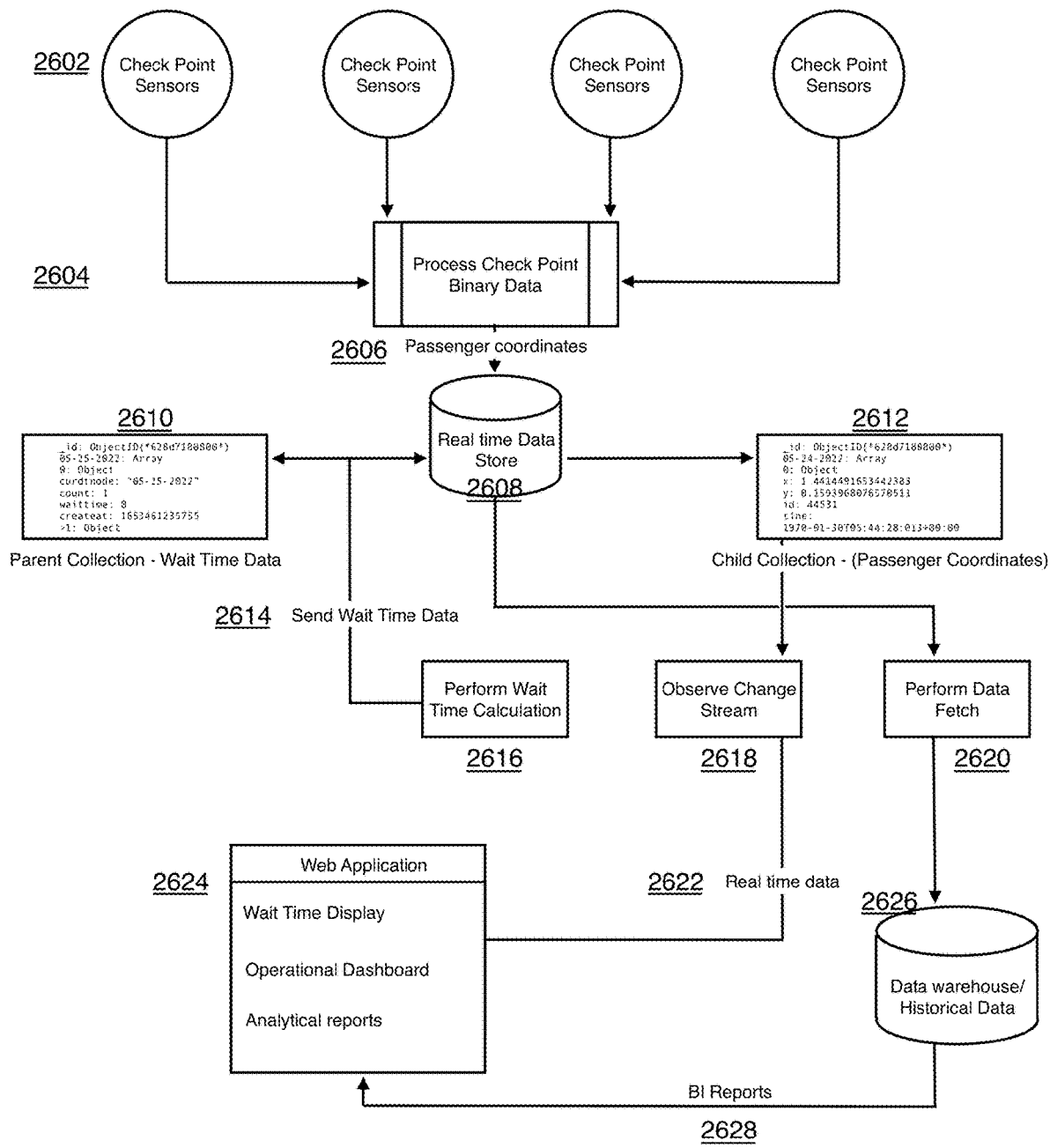
FIG. 26 is an illustration of Queue Wait Time data flow.

FIG. 26 is an illustration of Queue Wait Time data flow. FIG. 26 shows sensors 2602 sending object data to a process check point for binary data 2604. Passenger coordinates 2606 are sent to real-time data store 2608, which splits the data into parent collection of wait time data 2610 and child collection of passenger coordinates 2612. Wait time data 2614 is sent to a perform wait time calculation module 2616. Child collection 2612 is sent to an observe change stream module 2618, where real-time data 2622 is sent to a web application 2624 to show a wait time display, and operational dashboard, and analytical reports. The perform data fetch module 2620 communicates with a data warehouse/historical data store 2626, which is configured to send BI reports 2628 to the Web App 2624.

Example—Passenger TSA Screening

Passenger data is captured from a TSA security checkpoint using a camera. The camera is part of an MQTT system and connects to an MQTT client publisher module. The data is converted to JSON format.

The passenger data includes security checkpoint waiting area (AS), an airport object time of entry (TIN) into the security checkpoint waiting area, an airport object time of exit (TOUT) from the security checkpoint waiting area, and a time-registered airport object coordinate (PXYT) within the security checkpoint waiting area at periodic time intervals (Tn+1). The camera is configured with calibration programming instructions to receive infrared spectrum radiation of an airport object (vehicle or passenger), to capture the airport object data, to remove background noise from the airport object data, and is configured with privacy-screening programming instructions for applying a face blur to eliminate personally identifiable information from the airport object data.

The JSON airport object data is received at an online MQTT Broker of an MQTT Python Server via the MQTT client publisher module of the camera. The MQTT Broker establishes MQTT Topics associated with the JSON airport object data. The MQTT Python Server is configured with programming instructions to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. The storage database server is configured with application programming code to receive and store the JSON format airport object data, to provide subscriber-client access to the MQTT Topics, to manage time-series data, and to process the JSON format airport object data to generate a calculated wait time data (TOUT−TIN) for each airport object, and a time-registered airport object coordinate data (PXYT-A) for analyzing airport object wait time between each x-y coordinate of the airport object through the security checkpoint waiting area;

A Node.js Server in communication with the MQTT Broker is subscribed to the MQTT Topics of the JSON format airport object data. The Node.js Server is configured with application programming code to provide subscriber-client access to the MQTT Topics associated with the JSON format airport object data, to transmit, store, and manage the JSON format airport object data, the calculated wait time data (TOUT−TIN) for each airport object, and the time-registered airport object coordinates data (PXYT-A) for analyzing airport object wait time between each x-y coordinate of the airport object through the security checkpoint waiting area. The Node.js Server is also configured with application programming code to use the JSON format airport object data to generate at least three specific reports comprising a Wait time historical report, a Collection clean up report, and an airport object coordinates report, wherein the Node.js server is in communication with a Scheduler module, wherein the Scheduler receives the at least three specific reports from the Node.js Server. The Node.js Server is also configured with application programming code to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

A Rest API module (representational (RE) state(S) transfer (T), Application Programming Interface) in communication with the Node.js Server receives the the JSON format airport object data. The Rest API module is configured with application programming code to provide a set of rules to define how applications or devices connect to and communicate with each other, the REST API is configured with application programming code to use Uniform Resource Identifiers (URIs) to provide access to resources comprising the JSON format airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control.

A Socket.IO module in communication with the Node.js Server receives the JSON format airport object data, and is configured with application programming code to provide a library that enables low-latency, bidirectional and event-based communication between a REACT router client and the Node.js Server. The Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser.

A Route protection—Keycloak Server in communication with the Node.js Server receives the JSON format airport object data, and is configured with application programming code to provide a single sign-on security solution for web access and REST API web services to protect application communications on multiple platforms and multiple technology stacks using OpenID Connect and SAML protocols.

The React Router client in communication with the Socket.IO module receives the JSON format airport object data, and is configured with application programming code to provide a routing library for a React Server, to enable navigation among views of various components in a React Application, to allow changing the browser URL, and to keep a user interface (UI) in sync with an associated URL. The React Router client is also configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only.

One or more display screens receive the JSON format airport object data via the React Router, and the React Router is configured with application programming code to provide transmit JSON format airport object data. The one or more display screens comprising a real-time queue display screen or portion thereof if on a single screen, a real-time operations analysis display screen or portion thereof, a real-time mobile app display screen or portion thereof, and an analytical report display screen or portion thereof.

A Scheduler module in communication with the Node.js Server receives the JSON format airport object data, and is configured with application programming code to trigger a JavaScript function at our specified time or interval to run a job or a task at regular intervals or at a specified time, one of said JS functions is to generate historical analytical reports of the JSON format airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution.

And a Data Warehouse (My SQL) in communication with the Scheduler module receives the JSON format airport object data, and is configured with application programming code to provide a data management system to enable and support analytics and to perform queries and analysis of large amounts of historical JSON format airport object data. The Data Warehouse is also configured with application programming code to also provide analytical reports associated with MQTT Topics comprising an analytical report on usage of a particular Security Checkpoint (AS), and Security Checkpoint Analyzed (AS-A), an analytical report on airport object time of entry (TIN), and airport object time of entry Analyzed (TIN-A), an analytical report on airport object time of exit (TOUT), and airport object time of exit Analyzed (TOUT), an analytical report on time-registered airport object coordinates (PXYT), and time-registered airport object coordinates Analyzed (PXYT-A) for analyzing airport object wait time between each x-y coordinate of the airport object through the security checkpoint waiting area, and an analytical report for airport object wait times (TOUT–TIN) within the security checkpoint boundary area.

Example—Tracking Mobile Lounges

Vehicle GPS (or beacon) data is captured from an airport location using a GPS transponder attached to the airport mobile lounge. The GPS transponder is part of an MQTT system and connects to an MQTT client publisher module. The GPS transponder data is converted to JSON format.

The GPS transponder data includes security checkpoint waiting area (AS), an airport object time of entry (TIN) into the security checkpoint waiting area, an airport object time of exit (TOUT) from the security checkpoint waiting area, and a time-registered airport object coordinate (PXYT) within the security checkpoint waiting area at periodic time intervals (Tn+1).

The JSON airport object (GPS transponder) data is received at an online MQTT Broker of an MQTT Python Server via the MQTT client publisher module of the GPS transponder. The MQTT Broker establishes MQTT Topics associated with the JSON airport object data. The MQTT Python Server is configured with programming instructions to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. The storage database server is configured with application programming code to receive and store the JSON format airport object data, to provide subscriber-client access to the MQTT Topics, to manage time-series data, and to process the JSON format airport object data to generate a calculated wait time data (TOUT–TIN) for each airport object, and a time-registered airport object coordinate data (PXYT-A) for analyzing airport object wait time between each x-y coordinate of the airport object through the security checkpoint waiting area;

A Node.js Server in communication with the MQTT Broker is subscribed to the MQTT Topics of the JSON format airport object data. The Node.js Server is configured with application programming code to provide subscriber-client access to the MQTT Topics associated with the JSON format airport object data, to transmit, store, and manage the JSON format airport object data, the calculated wait time data (TOUT–TIN) for each airport object, and the time-registered airport object coordinates data (PXYT-A) for analyzing airport object wait time between each x-y coordinate of the airport object through the security checkpoint waiting area. The Node.js Server is also configured with application programming code to use the JSON format airport object data to generate at least three specific reports comprising a Wait time historical report, a Collection clean up report, and an airport object coordinates report, wherein the Node.js server is in communication with a Scheduler module, wherein the Scheduler receives the at least three specific reports from the Node.js Server. The Node.js Server is also configured with application programming code to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

A Rest API module (representational (RE) state(S) transfer (T), Application Programming Interface) in communication with the Node.js Server receives the the JSON format airport object data. The Rest API module is configured with application programming code to provide a set of rules to define how applications or devices connect to and communicate with each other, the REST API is configured with application programming code to use Uniform Resource Identifiers (URIs) to provide access to resources comprising the JSON format airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control.

A Socket.IO module in communication with the Node.js Server receives the JSON format airport object data, and is configured with application programming code to provide a library that enables low-latency, bidirectional and event-based communication between a REACT router client and the Node.js Server. The Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser.

A Route protection—Keycloak Server in communication with the Node.js Server receives the JSON format airport object data, and is configured with application programming code to provide a single sign-on security solution for web access and REST API web services to protect application communications on multiple platforms and multiple technology stacks using OpenID Connect and SAML protocols.

The React Router client in communication with the Socket.IO module receives the JSON format airport object data, and is configured with application programming code to provide a routing library for a React Server, to enable navigation among views of various components in a React Application, to allow changing the browser URL, and to keep a user interface (UI) in sync with an associated URL. The React Router client is also configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only.

One or more display screens receive the JSON format airport object data via the React Router, and the React Router is configured with application programming code to provide transmit JSON format airport object data. The one or more display screens comprising a real-time queue display screen or portion thereof if on a single screen, a real-time operations analysis display screen or portion thereof, a real-time mobile app display screen or portion thereof, and an analytical report display screen or portion thereof.

A Scheduler module in communication with the Node.js Server receives the JSON format airport object data, and is configured with application programming code to trigger a JavaScript function at our specified time or interval to run a job or a task at regular intervals or at a specified time, one of said JS functions is to generate historical analytical reports of the JSON format airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution.

And a Data Warehouse (My SQL) in communication with the Scheduler module receives the JSON format airport object data, and is configured with application programming code to provide a data management system to enable and support analytics and to perform queries and analysis of large amounts of historical JSON format airport object data. The Data Warehouse is also configured with application programming code to also provide analytical reports associated with MQTT Topics comprising an analytical report on usage of a particular Security Checkpoint (AS), and Security Checkpoint Analyzed (AS-A), an analytical report on airport object time of entry (TIN), and airport object time of entry Analyzed (TIN-A), an analytical report on airport object time of exit (TOUT), and airport object time of exit Analyzed (TOUT), an analytical report on time-registered airport object coordinates (PXYT), and time-registered airport object coordinates Analyzed (PXYT-A) for analyzing airport object wait time between each x-y coordinate of the airport object through the security checkpoint waiting area, and an analytical report for airport object wait times (TOUT-TIN) within the security checkpoint boundary area.

Example—Tracking Wheelchairs and Gate Shuttles

Similar to the vehicle example, airport wheelchair and airport gate shuttle location and dwell time data are tracked, monitored, stored, and reported on using the system described herein. Airport Asset GPS (or beacon) data is captured from an airport location using a GPS or local beacon transponder attached to the airport asset. The GPS transponder is part of an MQTT system and connects to an MQTT client publisher module. The GPS transponder data is converted to JSON format. The GPS transponder data includes security checkpoint waiting area (AS), an airport object time of entry (TIN) into the security checkpoint waiting area, an airport object time of exit (TOUT) from the security checkpoint waiting area, and a time-registered airport object coordinate (PXYT) within the security checkpoint waiting area at periodic time intervals (Tn+1).

The JSON airport object (GPS transponder) data is received at an online MQTT Broker of an MQTT Python Server via the MQTT client publisher module of the GPS transponder. The MQTT Broker establishes MQTT Topics. The MQTT Python Server is configured to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. A Node.js Server in communication with the MQTT Broker is subscribed to the MQTT Topics of the JSON format airport object data. The Node.js Server is configured with application programming code to provide subscriber-client access to the MQTT Topics, to generate at least three specific reports comprising a Wait time historical report, a Collection clean up report, and an airport object coordinates report, and to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

The Rest API module defines how applications or devices connect to and communicate with each other, using Uniform Resource Identifiers (URIs) to provide access to resources, the MQTT Topics, and the analytical data, to provide access by a client, to exchange representations of resources between a client and the Node.js Server using a standardized interface and protocol, to use metadata about a resource to control caching, detect transmission errors, negotiate an appropriate representation format, and perform authentication or access control.

The Socket.IO module provides a library that enables low-latency, bidirectional and event-based communication between a REACT router client and the Node.js Server.

The Route protection—Keycloak Server provides a single sign-on security solution for web access and REST API web services to protect application communications on multiple platforms and multiple technology stacks using OpenID Connect and SAML protocols.

The React Router client provides a routing library for a React Server, enables navigation among views of various components in a React Application, allows changing the browser URL, and keeps a user interface (UI) in sync with an associated URL. The React Router client also provides an API with built-in features comprising lazy code loading, dynamic route matching, and location transition handling, where the React router implements dynamic routing where a first client 279. One or more display screens display real-time queue display screen or portion thereof if on a single screen, a real-time operations analysis display screen or portion thereof, a real-time mobile app display screen or portion thereof, and an analytical report display screen or portion thereof.

The Scheduler module triggers a JavaScript function at our specified time or interval to run a job or a task at regular intervals or at a specified time, including generating historical analytical reports of the JSON format airport object data, and schedules a job at a specified date and times, provides support for recurrent jobs, support for persistence, support for horizontal scaling of job multiple processors across multiple hosts, and/or support for locking jobs and prevention of duplicate job execution.

And the Data Warehouse (My SQL) provides a data management system to enable and support analytics and to perform queries and analysis of large amounts of historical JSON format airport object data.

Example—Gate Management

Similar to the passenger TSA checkpoint example above, gate management is performed using the system herein to provide boarding passenger location and dwell time data, which can be tracked, monitored, stored, and reported on using the system described herein. Airport object data is captured from an airport location using one or more cameras capturing images of the airport object. The camera is part of an MQTT system and connects to an MQTT client publisher module. The camera data is converted to JSON format. The camera data includes security checkpoint (boarding gate) waiting area (AS), an airport object time of entry (TIN) into the security checkpoint waiting area, an airport object time of exit (TOUT) from the security checkpoint waiting area, and a time-registered airport object coordinate ($P_{XYT}$) within the security checkpoint waiting area at periodic time intervals (Tn+1).

The JSON airport object (camera) data is received at an online MQTT Broker of an MQTT Python Server via the MQTT client publisher module of the camera. The MQTT Broker establishes MQTT Topics. The MQTT Python Server is configured to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. A Node.js Server in communication with the MQTT Broker is subscribed to the MQTT Topics of the JSON format airport object data. The Node.js Server is configured with application programming code to provide subscriber-client access to the MQTT Topics, to generate at least three specific reports comprising a Wait time historical report, a Collection clean up report, and an airport object coordinates report, and to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

The Rest API module defines how applications or devices connect to and communicate with each other, using Uniform Resource Identifiers (URIs) to provide access to resources, the MQTT Topics, and the analytical data, to provide access by a client, to exchange representations of resources between a client and the Node.js Server using a standardized interface and protocol, to use metadata about a resource to control caching, detect transmission errors, negotiate an appropriate representation format, and perform authentication or access control.

The Socket.IO module provides a library that enables low-latency, bidirectional and event-based communication between a REACT router client and the Node.js Server.

The Route protection—Keycloak Server provides a single sign-on security solution for web access and REST API web services to protect application communications on multiple platforms and multiple technology stacks using OpenID Connect and SAML protocols.

The React Router client provides a routing library for a React Server, enables navigation among views of various components in a React Application, allows changing the browser URL, and keeps a user interface (UI) in sync with an associated URL. The React Router client also provides an API with built-in features comprising lazy code loading, dynamic route matching, and location transition handling, where the React router implements dynamic routing where a first client 290. One or more display screens display real-time queue display screen or portion thereof if on a single screen, a real-time operations analysis display screen or portion thereof, a real-time mobile app display screen or portion thereof, and an analytical report display screen or portion thereof.

The Scheduler module triggers a JavaScript function at our specified time or interval to run a job or a task at regular intervals or at a specified time, including generating historical analytical reports of the JSON format airport object data, and schedules a job at a specified date and times, provides support for recurrent jobs, support for persistence, support for horizontal scaling of job multiple processors across multiple hosts, and/or support for locking jobs and prevention of duplicate job execution.

And the Data Warehouse (My SQL) provides a data management system to enable and support analytics and to perform queries and analysis of large amounts of historical JSON format airport object data.

Example—Parking Management

Similar to the passenger TSA checkpoint example above, airport parking space management is performed using the system herein to provide airport parking space location and dwell time data, which can be tracked, monitored, stored, and reported on using the system described herein. Airport object data is captured from an airport location using one or more cameras capturing thermal or visible images of the airport object (parking facility). The camera is part of an MQTT system and connects to an MQTT client publisher module. The camera data is converted to JSON format. The camera data includes parking facility parking spot ($A_S$), airport object/parking spot time of entry ($T_{IN}$), an airport object/parking spot time of exit ($T_{OUT}$), and a time-registered airport object coordinate ($P_{XYT}$) at periodic time intervals ($T_{n+1}$).

The JSON airport object/parking spaces (camera) data is received at an online MQTT Broker of an MQTT Python Server via the MQTT client publisher module of the camera. The MQTT Broker establishes MQTT Topics. The MQTT Python Server is configured to publish, subscribe, unsubscribe, and process the JSON airport object data, said MQTT Python Server having a library of scripts for publishing, subscribing, unsubscribing, and processing the MQTT messages.

The JSON format airport object/parking spaces data is received at a storage database server (Mongo DB) in communication with the MQTT Python Server. A Node.js Server in communication with the MQTT Broker is subscribed to the MQTT Topics of the JSON format airport object data. The Node.js Server is configured with application programming code to provide subscriber-client access to the MQTT Topics, to generate at least three specific reports comprising a Wait time historical report, a Collection clean up report, and an airport object coordinates report, and to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

The Rest API module defines how applications or devices connect to and communicate with each other, using Uniform Resource Identifiers (URIs) to provide access to resources, the MQTT Topics, and the analytical data, to provide access by a client, to exchange representations of resources between a client and the Node.js Server using a standardized interface and protocol, to use metadata about a resource to control caching, detect transmission errors, negotiate an appropriate representation format, and perform authentication or access control.

The Socket.IO module provides a library that enables low-latency, bidirectional and event-based communication between a REACT router client and the Node.js Server.

The Route protection—Keycloak Server provides a single sign-on security solution for web access and REST API web services to protect application communications on multiple platforms and multiple technology stacks using OpenID Connect and SAML protocols.

The React Router client provides a routing library for a React Server, enables navigation among views of various components in a React Application, allows changing the browser URL, and keeps a user interface (UI) in sync with an associated URL. The React Router client also provides an API with built-in features comprising lazy code loading, dynamic route matching, and location transition handling, where the React router implements dynamic routing where a first client browser request is fully loaded by the React Router and subsequent client browser requests after the first are just for data only.

One or more display screens display real-time queue display screen or portion thereof if on a single screen, a real-time operations analysis display screen or portion thereof, a real-time mobile app display screen or portion thereof, and an analytical report display screen or portion thereof.

The Scheduler module triggers a JavaScript function at our specified time or interval to run a job or a task at regular intervals or at a specified time, including generating historical analytical reports of the JSON format airport object data, and schedules a job at a specified date and times, provides support for recurrent jobs, support for persistence, support for horizontal scaling of job multiple processors across multiple hosts, and/or support for locking jobs and prevention of duplicate job execution.

And the Data Warehouse (My SQL) provides a data management system to enable and support analytics and to perform queries and analysis of large amounts of historical JSON format airport object data.

Example—Airport Vehicles/Assets

Similar to the vehicle example herein, the location and dwell time data of airport emergency vehicles, baggage trucks, fuel services, catering, runway maintenance, jetway bridges, and so forth, are tracked, monitored, stored, and reported on using the system described. Airport Asset GPS (or beacon) data is captured from an airport location using a GPS or local beacon transponder attached to the airport asset. The GPS transponder is part of an MQTT system and connects to an MQTT client publisher module. The GPS transponder data is converted to JSON format. The GPS transponder data includes security checkpoint waiting area (AS), an airport object time of entry (TIN) into the security checkpoint waiting area, an airport object time of exit (TOUT) from the security checkpoint waiting area, and a time-registered airport object coordinate (PXYT) within the security checkpoint waiting area at periodic time intervals (Tn+1).

The JSON airport object (GPS transponder) data is received at an online MQTT Broker of an MQTT Python Server via the MQTT client publisher module of the GPS transponder. The MQTT Broker establishes MQTT Topics. The MQTT Python Server is configured to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. A Node.js Server in communication with the MQTT Broker is subscribed to the MQTT Topics of the JSON format airport object data. The Node.js Server is configured with application programming code to provide subscriber-client access to the MQTT Topics, to generate at least three specific reports comprising a Wait time historical report, a Collection clean up report, and an airport object coordinates report, and to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

The Rest API module defines how applications or devices connect to and communicate with each other, using Uniform Resource Identifiers (URIs) to provide access to resources, the MQTT Topics, and the analytical data, to provide access by a client, to exchange representations of resources between a client and the Node.js Server using a standardized interface and protocol, to use metadata about a resource to control caching, detect transmission errors, negotiate an appropriate representation format, and perform authentication or access control.

The Socket.IO module provides a library that enables low-latency, bidirectional and event-based communication between a REACT router client and the Node.js Server.

The Route protection—Keycloak Server provides a single sign-on security solution for web access and REST API web services to protect application communications on multiple platforms and multiple technology stacks using OpenID Connect and SAML protocols.

The React Router client provides a routing library for a React Server, enables navigation among views of various components in a React Application, allows changing the browser URL, and keeps a user interface (UI) in sync with an associated URL. The React Router client also provides an API with built-in features comprising lazy code loading, dynamic route matching, and location transition handling, where the React router implements dynamic routing where a first client browser request is fully loaded by the React Router and subsequent client browser requests after the first are just for data only .

One or more display screens display real-time queue display screen or portion thereof if on a single screen, a real-time operations analysis display screen or portion thereof, a real-time mobile app display screen or portion thereof, and an analytical report display screen or portion thereof.

The Scheduler module triggers a JavaScript function at our specified time or interval to run a job or a task at regular intervals or at a specified time, including generating historical analytical reports of the JSON format airport object data, and schedules a job at a specified date and times, provides support for recurrent jobs, support for persistence, support for horizontal scaling of job multiple processors across multiple hosts, and/or support for locking jobs and prevention of duplicate job execution.

And the Data Warehouse (My SQL) provides a data management system to enable and support analytics and to perform queries and analysis of large amounts of historical JSON format airport object data.

Example—Combined Passenger and Airport Assets

Similar to the examples above, the system herein is used to track, monitor, store, and report on passenger, vehicle, and asset location and dwell time, within a single system. Airport object data is captured from airport locations where passengers queue including TSA security checkpoints, boarding gate security checkpoints, passport/immigration control checkpoints, baggage waiting areas, transportation and taxi waiting areas, airport train waiting areas, airport parking spaces, airport vendor/restaurant waiting areas, and so forth. Airport vehicle and mobile asset data is captured from GPS transponders attached to the airport vehicle or mobile asset, including wheelchairs, gate shuttles, airport emergency vehicles, baggage trucks, fuel services, catering, runway maintenance, jetway bridges, and so forth.

The cameras and GPS (or beacon) transponder system (airport object data) are part of an MQTT system and connect to an MQTT client publisher module. The airport object data is converted to JSON format. The airport object data includes security checkpoint waiting area (AS), an airport object time of entry (TIN) into the waiting area, an airport object time of exit (TOUT) from the waiting area, and a time-registered airport object coordinate (PXYT) within the waiting area at periodic time intervals (Tn+1).

The JSON airport object data is received at an online MQTT Broker of an MQTT Python Server via the MQTT client publisher module of the collection device (camera, GPS transponder, beacon transponder). The MQTT Broker establishes MQTT Topics. The MQTT Python Server is configured to publish, subscribe, unsubscribe, and process the JSON airport object data, said MQTT Python Server having a library of scripts for publishing, subscribing, unsubscribing, and processing the MQTT messages.

The JSON format airport object data is received at a storage database server (Mongo DB) in communication with the MQTT Python Server. A Node.js Server in communication with the MQTT Broker is subscribed to the MQTT Topics of the JSON format airport object data. The Node.js Server is configured with application programming code to provide subscriber-client access to the MQTT Topics, to generate at least three specific reports comprising a Wait time historical report, a Collection clean up report, and an airport object coordinates report, and to create an instance of an HTTP server to handle requests, issue responses, save assets and files, play media, create directories, provide interaction between users and the Node.js server, to continue running by restarting after a crash or reboot, and to communicate and transmit to and from a Rest API application, a Socket.io application, and a Route Protection module.

The Rest API module defines how applications or devices connect to and communicate with each other, using Uniform Resource Identifiers (URIs) to provide access to resources, the MQTT Topics, and the analytical data, to provide access by a client, to exchange representations of resources between a client and the Node.js Server using a standardized interface and protocol, to use metadata about a resource to control caching, detect transmission errors, negotiate an appropriate representation format, and perform authentication or access control.

The Socket.IO module provides a library that enables low-latency, bidirectional and event-based communication between a REACT router client and the Node.js Server.

The Route protection—Keycloak Server provides a single sign-on security solution for web access and REST API web services to protect application communications on multiple platforms and multiple technology stacks using OpenID Connect and SAML protocols.

The React Router client provides a routing library for a React Server, enables navigation among views of various components in a React Application, allows changing the browser URL, and keeps a user interface (UI) in sync with an associated URL. The React Router client also provides an API with built-in features comprising lazy code loading, dynamic route matching, and location transition handling, where the React router implements dynamic routing where a first client browser request is fully loaded by the React Router and subsequent client browser requests after the first are just for data only.

One or more display screens display real-time queue display screen or portion thereof if on a single screen, a real-time operations analysis display screen or portion thereof, a real-time mobile app display screen or portion thereof, and an analytical report display screen or portion thereof.

The Scheduler module triggers a JavaScript function at our specified time or interval to run a job or a task at regular intervals or at a specified time, including generating historical analytical reports of the JSON format airport object data, and schedules a job at a specified date and times, provides support for recurrent jobs, support for persistence, support for horizontal scaling of job multiple processors across multiple hosts, and/or support for locking jobs and prevention of duplicate job execution.

And the Data Warehouse (My SQL) provides a data management system to enable and support analytics and to perform queries and analysis of large amounts of historical JSON format airport object data.

General Computer Systems

In particular embodiments, one or more computer systems perform one or more steps of one or more methods described or illustrated herein. In particular embodiments, one or more computer systems provide the functionalities described or illustrated herein. In particular embodiments, software running on one or more computer systems performs one or more steps of one or more methods described or illustrated herein or provides the functionalities described or illustrated herein. Particular embodiments include one or more portions of one or more computer systems. Herein, a reference to a computer system may encompass a computing device, and vice versa, where appropriate. Moreover, a reference to a computer system may encompass one or more computer systems, where appropriate.

This disclosure contemplates any suitable number of computer systems. This disclosure contemplates computer system taking any suitable physical form. As example and not by way of limitation, computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system may include one or more computer systems; be unitary or distributed; span multiple locations; span multiple machines; span multiple data centers; or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

In particular embodiments, a computer system includes a processor, memory, storage, an input/output (I/O) interface, a communication interface, and a bus. Although this disclosure describes and illustrates a particular computer system having a particular number of particular components in a particular arrangement, this disclosure contemplates any suitable computer system having any suitable number of any suitable components in any suitable arrangement.

In particular embodiments, the processor includes hardware for executing instructions, such as those making up a computer program. As an example and not by way of limitation, to execute instructions, the processor may retrieve (or fetch) the instructions from an internal register, an internal cache, memory, or storage; decode and execute them; and then write one or more results to an internal register, an internal cache, memory, or storage. In particular embodiments, the processor may include one or more internal caches for data, instructions, or addresses. This disclosure contemplates the processor including any suitable number of any suitable internal caches, where appropriate. As an example and not by way of limitation, the processor may include one or more instruction caches, one or more data caches, and one or more translation lookaside buffers (TLBs). Instructions in the instruction caches may be copies of instructions in memory or storage, and the instruction caches may speed up retrieval of those instructions by the processor. Data in the data caches may be copies of data in memory or storage that are to be operated on by computer instructions; the results of previous instructions executed by the processor that are accessible to subsequent instructions or for writing to memory or storage; or any other suitable data. The data caches may speed up read or write operations by the processor. The TLBs may speed up virtual-address translation for the processor. In particular embodiments, the processor may include one or more internal registers for data, instructions, or addresses. This disclosure contemplates the processor including any suitable number of any suitable internal registers, where appropriate. Where appropriate, the processor may include one or more arithmetic logic units (ALUs), be a multi-core processor, or include one or more processors. Although this disclosure describes and illustrates a particular processor, this disclosure contemplates any suitable processor.

In particular embodiments, memory includes main memory for storing instructions for the processor to execute or data for the processor to operate on. As an example and not by way of limitation, the computer system may load instructions from storage or another source (such as another computer system) to memory. The processor may then load the instructions from memory to an internal register or internal cache. To execute the instructions, the processor may retrieve the instructions from the internal register or internal cache and decode them. During or after execution of the instructions, the processor may write one or more results (which may be intermediate or final results) to the internal register or internal cache. The processor may then write one or more of those results to memory. In particular embodiments, the processor executes only instructions in one or more internal registers or internal caches or in memory (as opposed to storage or elsewhere) and operates only on data in one or more internal registers or internal caches or in memory (as opposed to storage or elsewhere). One or more memory buses (which may each include an address bus and a data bus) may couple the processor to memory. The bus may include one or more memory buses, as described in further detail below. In particular embodiments, one or more memory management units (MMUs) reside between processor and memory and facilitate access to the memory requested by the processor. In particular embodiments, memory includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory may include one or more memories, where appropriate. Although this disclosure describes and illustrates particular memory, this disclosure contemplates any suitable memory.

In particular embodiments, the storage includes mass storage for data or instructions. As an example and not by way of limitation, the storage may include a hard disk drive (HDD), a floppy disk drive, flash memory, an optical disc, a magneto-optical disc, magnetic tape, or a Universal Serial Bus (USB) drive or a combination of two or more of these. Storage may include removable or non-removable (or fixed) media, where appropriate. Storage may be internal or external to the computer system, where appropriate. In particular embodiments, the storage is non-volatile, solid-state memory. In particular embodiments, the storage includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage taking any suitable physical form. Storage may include one or more storage control units facilitating communication between the processor and the storage, where appropriate. Where appropriate, the storage may include one or more storages. Although this disclosure describes and illustrates particular storage, this disclosure contemplates any suitable storage.

In particular embodiments, I/O interface includes hardware, software, or both, providing one or more interfaces for communication between computer system and one or more I/O devices. The computer system may include one or more of these I/O devices, where appropriate. One or more of these I/O devices may enable communication between a person and computer system. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces for them. Where appropriate, I/O interface may include one or more device or software drivers enabling processor to drive one or more of these I/O devices. I/O interface may include one or more I/O interfaces, where appropriate. Although this disclosure describes and illustrates a particular I/O interface, this disclosure contemplates any suitable I/O interface.

In particular embodiments, the communication interface includes hardware, software, or both providing one or more interfaces for communication (such as, for example, packet-based communication) between the computer system and one or more other computer systems or one or more networks. As an example and not by way of limitation, the communication interface may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface for it. As an example and not by way of limitation, the computer system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. The computer system may include any suitable communication interface for any of these networks, where appropriate. The communication interface may include one or more communication interfaces, where appropriate. Although this disclosure describes and illustrates a particular communication interface, this disclosure contemplates any suitable communication interface.

In particular embodiments, the bus includes hardware, software, or both coupling components of a computer system to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Additional Definitions

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. Like numbers refer to like elements throughout.

The examples and/or embodiments described herein are intended merely to facilitate an understanding of structures, functions, and/or aspects of the embodiments, ways in which the embodiments may be practiced, and/or to further enable those skilled in the art to practice the embodiments herein. Similarly, methods and/or ways of using the embodiments described herein are provided by way of example only and not limitation. Specific uses described herein are not provided to the exclusion of other uses unless the context expressly states otherwise.

Legal Equivalents

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations.

The embodiments described herein can include various combinations and/or sub-combinations of the functions, components, and/or features of the different embodiments described. Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed as the invention:

1. A computer implemented method for using a combined camera and GPS system to track, monitor, store, and report on locations and dwell times of airport objects comprising passengers, vehicles and mobile assets at airport security checkpoints and other airport-controlled locations using programming instructions saved to memory and executable on a processor, comprising the steps:

receiving airport object data associated with one or more passengers, vehicles and mobile assets at airport security checkpoints via an CF Network for container-to-container networking with a QueueHub VRF module for virtual routing and forwarding that provides connection and communication between one or more box and bullet network cameras, one or more vision and time of flight sensors, and one or more GPS and mobile transponders mounted on said vehicles and mobile assets configured to communicate with orbiting satellites and with a cellular network antenna;

assigning MQTT topics to each of said cameras, sensors, and GPS and mobile transponders using an internal network Cloud Provider having a Python Middleware and a MQTT Broker with MQTT Protocol that is in communication with the CF Network with the QueueHub VRF module, the Python Middleware is in communication with MQTT topics from the box and bullet network cameras, the vision and time of flight sensors, and the GPS and mobile transponders; the MQTT Broker tracks and communicates with connected devices using the MQTT topics for cameras, sensors, and GPS and mobile transponders;

receiving airport object data at a Real-time database (DB) using a DB Cloud Provider in communication with the cameras, sensors, and GPS and mobile transponders, using the internal network Cloud Provider, middleware and MQTT broker;

managing integration of airport object data for web, mobile, and digital display using a Nodejs Middleware housed at a Nodejs Cloud Provider that is connected to the Real-time DB, the Nodejs Middleware in communication with a Socket.io module, a REST API module, and a Scheduler module, a REACT QueueHub App Dashboard is connected to the Nodejs middleware thru the Socket.io module, the REACT QueueHub App dashboard connects to a Route Protection module through a Keycloak (IAM) module, one or more Front-end clients for web, mobile, digital display are connected to the Route Protection module through a Basic Authentication module, the Route protection module is connected to the Nodejs middleware through the REST API module, the Scheduler module is connected to a data warehouse and then to the Front-end clients; and Outputting predicted values to the Front-end clients using a Model Building module for predictive modeling that receives historical data from the Data warehouse, and outputs Predicted Values from the Data warehouse to the Front-end clients.

2. The invention according to claim 1, wherein the method uses one or more cameras, one or more GPS transponders, and optionally one or more WiFi beacon transmitters or airport-wide tracking devices.

3. The invention according to claim 1, wherein the method comprises a Wayfinding module in communication with an airport mobile app, configured with programming instructions to display to a passenger and vehicle operator directions to an airport location using a wayfinding arrow overlay that provides instructions to navigate the airport terminals or airport properties.

4. The invention according to claim 1, wherein the method comprises a display module configured with programming instructions to provide a passenger dashboard and an airport operator dashboard, the passenger dashboard comprising display for reporting waiting area dwell times, estimated time of arrival walking to a selected destination, wayfinding directions, airport notifications, airline notifications, airport vendor notifications, baggage information, transportation information, wheelchair and gate shuttle access, and emergency notifications, the airport operator dashboard comprising display for providing admin access to manage the system, reporting passenger waiting area dwell times, reporting vehicle locations and dwell times, reporting system status, sending airport internal messages, sending airport notifications, receiving airline notifications, receiving airport vendor notifications, receiving baggage information, receiving transportation information, sending and receiving wheelchair and gate shuttle access and requests, and sending and receiving emergency notifications.

5. The invention according to claim 1, wherein the method comprises an external data module for receiving external data including parking vendor data, airline data, weather data, TSA data, emergency services data, law enforcement data, immigration data, border and customs information, baggage data, airport transportation data, airport vendor data, airport maintenance data, and cargo data.

6. A computer implemented system for using a combined camera and GPS system to track, monitor, store, and report on locations and dwell times of airport objects comprising passengers, vehicles and mobile assets at airport security checkpoints and other airport-controlled locations using programming instructions saved to memory and executable on a processor, comprising:

a CF Network for container-to-container networking with a QueueHub VRF module for virtual routing and forwarding that provides connection and communication between one or more box and bullet network cameras, one or more vision and time of flight sensors, and one or more GPS and mobile transponders mounted on a vehicle; the cameras, sensors, and GPS and mobile transponders assigned with MQTT topics; the GPS and mobile transponders configured to communicate with orbiting satellites and with a cellular network antenna;

an internal network Cloud Provider having Python Middleware and Broker-MQTT Protocol is in communication with the CF Network with the QueueHub VRF module, the Python Middleware is in communication with MQTT topics from the box and bullet network cameras, the vision and time of flight sensors, and the GPS and mobile transponders; an MQTT Broker tracks and communicates with connected devices using the MQTT topics for cameras, sensors, and GPS and mobile transponders;

a Real-time database (DB) using a DB Cloud Provider receives feeds from cameras, sensors, and GPS and mobile transponders, using the internal network Cloud Provider, middleware and MQTT broker;

a Nodejs Middleware housed at a Nodejs Cloud Provider is connected to the Real-time DB, the Nodejs Middleware manages various integrations for web, mobile, and digital display;

a Socket.io module, a REST API module, and a Scheduler module are in communication with the Nodejs Middleware, a REACT QueueHub App Dashboard is connected to the Nodejs middleware thru the Socket.io module, the REACT QueueHub App dashboard connects to a Route Protection module through a Keycloak (IAM) module, one or more Front-end clients for web, mobile, digital display, are connected to the Route Protection module through a Basic Authentication module, the Route protection module is connected to the Nodejs middleware through the REST API module, the Scheduler module is connected to a data warehouse and then to the Front-end clients; and a Model Building module for predictive modelling receives historical data from the Data warehouse, and outputs Predicted Values to the Front-end clients.

7. The invention according to claim 6, wherein the system uses one or more cameras, one or more GPS transponders, and optionally one or more WiFi beacon transmitters or airport-wide tracking devices.

8. The invention according to claim 6, wherein the system comprises a Wayfinding module in communication with an airport mobile app, configured with programming instructions to display to a passenger and vehicle operator directions to an airport location using a wayfinding arrow overlay that provides instructions to navigate the airport terminals or airport properties.

9. The invention according to claim 6, wherein the system comprises a display module configured with programming instructions to provide a passenger dashboard and an airport operator dashboard, the passenger dashboard comprising display for reporting waiting area dwell times, estimated time of arrival walking to a selected destination, wayfinding directions, airport notifications, airline notifications, airport vendor notifications, baggage information, transportation information, wheelchair and gate shuttle access, and emergency notifications, the airport operator dashboard comprising display for providing admin access to manage the system, reporting passenger waiting area dwell times, reporting vehicle locations and dwell times, reporting system status, sending airport internal messages, sending airport notifications, receiving airline notifications, receiving airport vendor notifications, receiving baggage information, receiving transportation information, sending and receiving wheelchair and gate shuttle access and requests, and sending and receiving emergency notifications.

10. The invention according to claim 6, wherein the system comprises an external data module for receiving external data including parking vendor data, airline data, weather data, TSA data, emergency services data, law enforcement data, immigration data, border and customs information, baggage data, airport transportation data, airport vendor data, airport maintenance data, and cargo data.

11. A computer-implemented method for using a combined camera and GPS system to track, monitor, store, and report on locations of airport objects (passengers, vehicles and mobile assets) as well as track, monitor, store, and report on dwell times of airport objects at airport security checkpoints and other airport-controlled locations using programming instructions saved to memory and executable on a processor, comprising the steps:

a. Receiving airport object camera data associated with at least one security checkpoint waiting area in the airport via an MQTT camera client publisher module in communication with at least one camera, and converting said airport object data to JSON format, wherein said airport object camera data is airport passenger data, airport vehicle data, or both, said airport object camera data comprising the security checkpoint waiting area ($A_S$), an airport object (vehicle or passenger) time of entry ($T_{IN}$) into the security checkpoint waiting area, an airport object (vehicle or passenger) time of exit ($T_{OUT}$) from the security checkpoint waiting area, and a time-registered airport object (vehicle or passenger) coordinate ($P_{XYT}$) within the security checkpoint waiting area at periodic time intervals ($T_{n+1}$), wherein said camera is configured with calibration programming instructions to receive infrared spectrum radiation or visible light radiation of an airport object (vehicle or passenger), to capture the airport object data, to remove background noise from the airport object data, and wherein said camera is configured with privacy-screening programming instructions for applying a face blur to eliminate personally identifiable information from the airport object data;

b. Receiving airport object GPS data associated with at least one airport vehicle object at a security checkpoint waiting area in the airport via an MQTT camera client publisher module in communication with at least one GPS transponder attached to the airport vehicle object, and converting said airport vehicle object GPS data to JSON format, c. Receiving combined JSON format airport object data comprising the JSON format airport object data and the JSON format airport object GPS data, at an online MQTT Broker of an MQTT Python Server via the MQTT client publisher module of the camera and via the MQTT client publisher module of the GPS transponder, said MQTT Broker establishing MQTT Topics associated with the JSON airport object data, said MQTT Topics comprising a Security Checkpoint ($A_S$) Topic, a Security Checkpoint Analyzed ($A_{S-A}$) Topic, an airport object time of entry ($T_{IN}$) Topic, an airport object time of entry Analyzed ($T_{IN-A}$) Topic, an airport object time of exit ($T_{OUT}$) Topic, an airport object time of exit Analyzed ($T_{OUT}$) Topic, a time-registered airport object coordinates ($P_{XYT}$) Topic, a time-registered airport object coordinates Analyzed ($P_{XYT-A}$) Topic, and an airport object wait time ($T_{OUT}-T_{IN}$) Topic;

said MQTT Python Server configured with programming instructions to publish, subscribe, unsubscribe, and process the JSON airport object data, said MQTT Python Server having a library of scripts for publishing, subscribing, unsubscribing, and processing the MQTT messages;

d. Receiving the JSON format airport object data at a storage database server (Mongo DB) in communication with the MQTT Python Server, the storage database server is configured with application programming code to receive the JSON format airport object data, to store the JSON format airport object data, to provide subscriber-client access to the MQTT Topics, to manage time-series data, and to process the JSON format airport object data to generate a calculated wait time data ($T_{OUT}-T_{IN}$) for each airport object, and a time-registered airport object coordinate data ($P_{XYT-A}$) for analyzing airport object wait time between each x-y coordinate of the airport object through the security checkpoint waiting area;

e. Subscribing to the MQTT Topics of the JSON format airport object data via a Node.js Server in communication with the MQTT Broker, the Node.js Server is configured with application programming code to provide subscriber-client access to the MQTT Topics associated with the JSON format airport object data, to transmit, store, and manage the JSON format airport object data, the calculated wait time data ($T_{OUT}-T_{IN}$) for each airport object, and the time-registered airport object coordinates data ($P_{XYT-A}$) for analyzing airport object wait time between each x-y coordinate of the airport object through the security checkpoint waiting area, the Node.js Server is configured with application programming code to use the JSON format airport object data to generate at least three specific reports comprising a Wait time historical report, a Collection clean up report, and an airport object coordinates report, wherein the Node.js server is in communication with a Scheduler module, wherein the Scheduler receives the at least three specific reports from the Node.js Server, the Node.js Server is configured with application programming code to create an instance of an HTTP server to handle requests, issue responses, save assets and files, play media, create directories, provide interaction between users and the Node.js server, to continue running by restarting after a crash or reboot, the Node Server is configured with application programming code to communicate and transmit to and from a Rest API application, a Socket.io application, and a Route Protection module;

f. Receiving the JSON format airport object data at a Rest API module (representational (RE) state(S) transfer (T), Application Programming Interface) in communication with the Node.js Server, the Rest API module is configured with application programming code to provide a set of rules to define how applications or devices connect to and communicate with each other, the REST API is configured with application programming code to use Uniform Resource Identifiers (URIs) to provide access to resources comprising the JSON format airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control;

g. Receiving the JSON format airport object data at a Socket.IO module in communication with the Node.js Server, the Socket.IO module is configured with application programming code to provide a library that enables low-latency, bidirectional and event-based communication between a REACT router client and the Node.js Server, said Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser;

h. Receiving the JSON format airport object data at a Route protection—Keycloak Server in communication with the Node.js Server, the Route protection—Keycloak Server is configured with application programming code to provide a single sign-on security solution for web access and REST API web services to protect application communications on multiple platforms and multiple technology stacks using OpenID Connect and SAML protocols;

i. Receiving the JSON format airport object data at the React Router client in communication with the Socket.IO module, the React Router client is configured with application programming code to provide a routing library for a React Server, to enable navigation among views of various components in a React Application, to allow changing the browser URL, and to keep a user interface (UI) in sync with an associated URL, the React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only;

j. Receiving the JSON format airport object data at multiple display screens via the React Router, the multiple display screens in communication with the React Router and the multiple display screens and the React Router are configured with application programming code to provide transmit JSON format airport object data, the multiple display screens comprising a real-time queue display screen, a real-time operations analysis display screen, a real-time mobile app display screen, and an analytical report display screen;

k. Receiving the JSON format airport object data at a Scheduler module in communication with the Node.js Server, the Scheduler module is configured with application programming code to trigger a JavaScript function at our specified time or interval to run a job or a task at regular intervals or at a specified time, one of said JS functions is to generate historical analytical reports of the JSON format airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution; and l. Receiving the JSON format airport object data at a Data Warehouse (My SQL) in communication with the Scheduler module, the Data Warehouse is configured with application programming code to provide a data management system to enable and support analytics and to perform queries and analysis of large amounts of historical JSON format airport object data, the the Data Warehouse is configured with application programming code to also provide analytical reports associated with MQTT Topics comprising an analytical report on usage of a particular Security Checkpoint ($A_S$), and Security Checkpoint Analyzed ($A_{S-A}$), an analytical report on airport object time of entry ($T_{IN}$), and airport object time of entry Analyzed ($T_{IN-A}$), an analytical report on airport object time of exit ($T_{OUT}$), and airport object time of exit Analyzed ($T_{OUT}$), an analytical report on time-registered airport object coordinates ($P_{XYT}$), and time-registered airport object coordinates Analyzed ($P_{XYT-A}$) for analyzing airport object wait time between each x-y coordinate of the airport object through the security checkpoint waiting area, and an analytical report for airport object wait times ($T_{OUT}$-$T_{IN}$) within the security checkpoint boundary area.

12. The invention according to claim 11, wherein the method uses one or more cameras, one or more GPS transponders, and optionally one or more WiFi beacon transmitters or airport-wide tracking devices.

13. The invention according to claim 11, wherein the method comprises a Wayfinding module in communication with an airport mobile app, configured with programming instructions to display to a passenger and vehicle operator directions to an airport location using a wayfinding arrow overlay that provides instructions to navigate the airport terminals or airport properties.

14. The invention according to claim 11, wherein the method comprises a display module configured with programming instructions to provide a passenger dashboard and an airport operator dashboard, the passenger dashboard comprising display for reporting waiting area dwell times, estimated time of arrival walking to a selected destination, wayfinding directions, airport notifications, airline notifications, airport vendor notifications, baggage information, transportation information, wheelchair and gate shuttle access, and emergency notifications, the airport operator dashboard comprising display for providing admin access to manage the system, reporting passenger waiting area dwell times, reporting vehicle locations and dwell times, reporting system status, sending airport internal messages, sending airport notifications, receiving airline notifications, receiving airport vendor notifications, receiving baggage information, receiving transportation information, sending and receiving wheelchair and gate shuttle access and requests, and sending and receiving emergency notifications.

15. The invention according to claim 11, wherein the method comprises an external data module for receiving external data including parking vendor data, airline data, weather data, TSA data, emergency services data, law enforcement data, immigration data, border and customs information, baggage data, airport transportation data, airport vendor data, airport maintenance data, and cargo data.

16. A computer-implemented system for using a combined camera and GPS system to track, monitor, store, and report on locations of airport objects comprising passengers, vehicles and mobile assets and to track, monitor, store, and report on dwell times of airport objects at airport security checkpoints and other airport-controlled locations using programming instructions saved to memory and executable on a processor, comprising:

a. At least one airport object camera associated with at least one security checkpoint waiting area in the airport configured for receiving airport object camera data, an MQTT camera client publisher module in communication with the at least one airport object camera, said airport object camera data converted to JSON format, said airport object camera data comprising the security checkpoint waiting area ($A_S$), an airport object time of entry ($T_{IN}$) into a security checkpoint waiting area, an airport object time of exit ($T_{OUT}$) from the security checkpoint waiting area, and time-registered airport object coordinates ($P_{XYT}$) within the security checkpoint waiting area at periodic time intervals ($T_{n+1}$), wherein said camera is configured with calibration programming instructions to receive infrared spectrum radiation of an airport object to capture airport object data and remove background noise (thermal or visible radiation) from the airport object data, and wherein said camera is configured with privacy-screening programming instructions for applying a face blur to eliminate personally identifiable information from said airport object data;

b. at least one GPS transponder attached to the airport vehicle object in communication with an MQTT camera client publisher module configured to receive airport object GPS data associated with the airport vehicle object at a security checkpoint waiting area in the airport, and convert said airport vehicle object GPS data to JSON format, c. an online MQTT Broker of an MQTT Python Server in communication with the MQTT client publisher module of the camera configured for combined JSON format airport object data comprising the JSON format airport object data and the JSON format airport object GPS data, said MQTT Broker establishing MQTT Topics associated with the airport object data, said MQTT Topics comprising a Security Checkpoint ($A_S$) Topic, a Security Checkpoint Analyzed ($A_{S-A}$) Topic, an airport object time of entry ($T_{IN}$) Topic, an airport object time of entry Analyzed ($T_{IN-A}$) Topic, an airport object time of exit ($T_{OUT}$) Topic, an airport object time of exit Analyzed ($T_{OUT}$) Topic, a time-registered airport object coordinates ($P_{XYT}$) Topic, a time-registered airport object coordinates Analyzed ($P_{XYT-A}$) Topic, and a airport object wait time ($T_{OUT}$-$T_{IN}$) Topic; said MQTT Python Server configured with programming instructions to publish, subscribe, unsubscribe, and process the airport object data, said MQTT Python Server having a library of scripts for publishing, subscribing, unsubscribing, and processing the MQTT messages;

d. a storage database server (Mongo DB) in communication with the MQTT Python Server, the storage database server is configured with application programming code to receive the airport object data, to store the airport object data, to provide subscriber-client access to the MQTT Topics, to manage time-series data, and to process the airport object data to generate a calculated wait time data ($T_{OUT}$-$T_{IN}$) for each airport object, and a time-registered airport object coordinates data ($P_{XYT-A}$) for analyzing airport object wait time between each x-y coordinate of the airport object through the security checkpoint waiting area;

e. a Node.js Server in communication with the MQTT Broker configured for subscribing to the MQTT Topics of the airport object data, the Node.js Server is configured with application programming code to provide subscriber-client access to the MQTT Topics associated with the airport object data, to transmit, store, and manage the airport object data, the calculated wait time data ($T_{OUT}$-$T_{IN}$) for each airport object, and the time-registered airport object coordinates data ($P_{XYT-A}$) for analyzing airport object wait time between each x-y coordinate of the airport object through the security checkpoint waiting area, the Node.js Server is configured with application programming code to use the airport object data to generate at least three specific reports comprising a Wait time historical report, a Collection clean up report, and a airport object coordinates report, wherein the Node.js server is in communication with a Scheduler module, wherein the Scheduler receives the at least three specific reports from the Node.js Server, the Node.js Server is configured with application programming code to create an instance of an HTTP server to handle requests, issue responses, save assets and files, play media, create directories, provide interaction between users and the Node.js server, to continue running by restarting after a crash or reboot, the Node Server is configured with application programming code to communicate and transmit to and from a Rest API application, a Socket.io application, and a Route Protection module;

f. a REST API module (representational (RE) state(S) transfer (T), Application Programming Interface) in communication with the Node.js Server, the REST API module is configured with application programming code for receiving the airport object data, and to provide a set of rules to define how applications, clients, and servers connect to and communicate with each other, the REST API is configured with application programming code to use Uniform Resource Identifiers (URIs) to provide access to resources comprising the airport object data, the MQTT Topics, and the analytical data, decoupled from representation to provide access by a client in various formats comprising HTML, XML, plain text, PDF, JPEG, and JSON, to exchange representations of resources between a client and the Node.js Server by using a standardized interface and protocol, to use metadata about a resource to control caching, detect transmission errors, negotiate an appropriate representation format, and perform authentication or access control;

g. a Socket.IO module in communication with the Node.js Server, the Socket.IO module is configured with application programming code for receiving the airport object data, and to provide a library that enables low-latency, bidirectional and event-based communication between a REACT router client and the Node.js Server, said Socket.IO is built on top of the WebSocket communication protocol and provides one or more additional guarantees including fallback to HTTP long-polling and automatic reconnection, wherein a WebSocket module implements the WebSocket communication protocol to provide a full-duplex and low-latency channel between the Node.js Server and a client browser;

h. a Route protection—Keycloak Server in communication with the Node.js Server, the Route protection—Keycloak Server is configured with application programming code for receiving the airport object data, and to provide a single sign-on security solution for web access and REST API web services to protect application communications on multiple platforms and multiple technology stacks using OpenID Connect and SAML protocols;

i. a React Router client in communication with the Socket.IO module, the React Router client is configured with application programming code for receiving the airport object data, and to provide a routing library for a React Server, to enable navigation among views of various components in a React Application, to allow changing the browser URL, and to keep a user interface (UI) in sync with an associated URL, the React Router client is configured with application programming code to also provide an API with built-in features comprising lazy code loading, dynamic route matching, and location transition handling, wherein the React router implements dynamic routing where a first client browser request is fully loaded by the React Router and subsequent client browser requests after the first are just for data only;

j. multiple display screens in communication with the React Router, the multiple display screens and the React Router are configured with application programming code for receiving airport object data and to transmit airport object data to the multiple display screens, the multiple display screens comprising a real-time queue display screen, a real-time operations analysis display screen, a real-time mobile app display screen, and an analytical report display screen;

k. a Scheduler module in communication with the Node.js Server, the Scheduler module is configured with application programming code for receiving airport object data and to trigger a JavaScript function at our specified time or interval to run a job or a task at regular intervals or at a specified time, one of said JS functions is to generate historical analytical reports of the airport object data, the Scheduler module comprising support for scheduling a job at a specified date and times, support for recurrent jobs, support for persistence, support for horizontal scaling of job multiple processors across multiple hosts, and/or support for locking jobs and prevention of duplicate job execution; and l. a Data Warehouse (My SQL) in communication with the Scheduler module, the Data Warehouse is configured with application programming code for receiving airport object data and to provide a data management system to enable and support analytics and to perform queries and analysis of large amounts of historical airport object data, the the Data Warehouse is configured with application programming code to also provide analytical reports associated with MQTT Topics comprising an analytical report on usage of a particular Security Checkpoint ($A_S$), and Security Checkpoint Analyzed ($A_{S-A}$), an analytical report on airport object time of entry ($T_{IN}$), and airport object time of entry Analyzed ($T_{IN-A}$), an analytical report on airport object time of exit ($T_{OUT}$), and airport object time of exit Analyzed ($T_{OUT}$), an analytical report on time-registered airport object coordinates ($P_{XYT}$), and time-registered airport object coordinates Analyzed ($P_{XYT-A}$) for analyzing airport object wait time between each x-y coordinate of the airport object through the security checkpoint waiting area, and an analytical report for airport object wait times ($T_{OUT}-T_{IN}$) within the security checkpoint boundary area.

17. The invention according to claim 16, wherein the system uses one or more cameras, one or more GPS transponders, and optionally one or more WiFi beacon transmitters or airport-wide tracking devices.

18. The invention according to claim 16, wherein the system comprises a Wayfinding module in communication with an airport mobile app, configured with programming instructions to display to a passenger and vehicle operator directions to an airport location using a wayfinding arrow overlay that provides instructions to navigate the airport terminals or airport properties.

19. The invention according to claim 16, wherein the system comprises a display module configured with programming instructions to provide a passenger dashboard and an airport operator dashboard, the passenger dashboard comprising display for reporting waiting area dwell times, estimated time of arrival walking to a selected destination, wayfinding directions, airport notifications, airline notifications, airport vendor notifications, baggage information, transportation information, wheelchair and gate shuttle access, and emergency notifications, the airport operator dashboard comprising display for providing admin access to manage the system, reporting passenger waiting area dwell times, reporting vehicle locations and dwell times, reporting system status, sending airport internal messages, sending airport notifications, receiving airline notifications, receiving airport vendor notifications, receiving baggage information, receiving transportation information, sending and receiving wheelchair and gate shuttle access and requests, and sending and receiving emergency notifications.

20. The invention according to claim 16, wherein the system comprises an external data module for receiving external data including parking vendor data, airline data, weather data, TSA data, emergency services data, law enforcement data, immigration data, border and customs information, baggage data, airport transportation data, airport vendor data, airport maintenance data, and cargo data.

* * * * *